United States Patent
Esenlik et al.

(10) Patent No.: US 12,047,555 B2
(45) Date of Patent: Jul. 23, 2024

(54) ADAPTIVE FILTER STRENGTH SIGNALLING FOR GEOMETRIC PARTITION MODE

(71) Applicant: Huawei Technologies Co., Ltd., Shenzhen (CN)

(72) Inventors: Semih Esenlik, Munich (DE); Max Blaeser, Aachen (DE); Zhijie Zhao, Munich (DE); Han Gao, Munich (DE); Biao Wang, Munich (DE); Anand Meher Kotra, Munich (DE); Elena Alexandrovna Alshina, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 17/557,930

(22) Filed: Dec. 21, 2021

(65) Prior Publication Data

US 2022/0116586 A1     Apr. 14, 2022

Related U.S. Application Data

(63) Continuation of application No. PCT/CN2020/097069, filed on Jun. 19, 2020.

(51) Int. Cl.
*H04N 19/103*     (2014.01)
*H04N 19/119*     (2014.01)
(Continued)

(52) U.S. Cl.
CPC ......... *H04N 19/103* (2014.11); *H04N 19/119* (2014.11); *H04N 19/132* (2014.11);
(Continued)

(58) Field of Classification Search
None
See application file for complete search history.

(56) References Cited

U.S. PATENT DOCUMENTS

| | | | |
|---|---|---|---|
| 10,165,283 | B1 | 12/2018 | Chen et al. |
| 2007/0098067 | A1 | 5/2007 | Kim et al. |

(Continued)

FOREIGN PATENT DOCUMENTS

| | | |
|---|---|---|
| CN | 107318015 A | 11/2017 |
| CN | 107995489 A | 5/2018 |

(Continued)

OTHER PUBLICATIONS

Ru-Ling et al., CE10: Triangular prediction unit mode (CE10.3.1 and CE10.3.2), JVET 11th Meeting: Ljubljana, SI, Jul. 10-18, 2018. (Year: 2018).*

(Continued)

*Primary Examiner* — James M Anderson, II
(74) *Attorney, Agent, or Firm* — Leydig, Voit & Mayer, Ltd.

(57) ABSTRACT

A method for coding implemented by a decoding device or an encoding device includes: obtaining a first prediction mode for a first sub-block, obtaining a second prediction mode for a second sub-block; obtaining a first prediction value for a sample in the current block according to the first prediction mode, obtaining a second prediction value for the sample in the current block according to the second prediction mode; obtaining a value of an indicator, the value of the indicator indicating a blending operation which is performed for the sample in the current block; and obtaining a combined prediction value for the sample in the current block, according to the value of the indictor, the first prediction value, and the second prediction value. The blending operation adaptively performs around a separation line dividing the current block into at least the first sub-block and the second sub-block.

18 Claims, 20 Drawing Sheets

(51) Int. Cl.
  *H04N 19/132*  (2014.01)
  *H04N 19/176*  (2014.01)
  *H04N 19/46*  (2014.01)
  *H04N 19/70*  (2014.01)

(52) U.S. Cl.
  CPC .......... *H04N 19/176* (2014.11); *H04N 19/46* (2014.11); *H04N 19/70* (2014.11)

(56) References Cited

U.S. PATENT DOCUMENTS

| | | |
|---|---|---|
| 2010/0208818 A1 | 8/2010 | Yin et al. |
| 2018/0205964 A1 | 7/2018 | Mukherjee et al. |
| 2021/0168409 A1* | 6/2021 | Furht .................... H04N 19/96 |

FOREIGN PATENT DOCUMENTS

| | | |
|---|---|---|
| CN | 109819255 A | 5/2019 |
| EP | 3217663 A1 | 9/2017 |
| EP | 2050279 B1 | 8/2018 |
| WO | 2018092870 A1 | 5/2018 |
| WO | 2020253830 A1 | 12/2020 |

OTHER PUBLICATIONS

Van et al., "CE10-related: Inter-intra prediction combination," Joint Video Experts Team (JVET) of ITU-T SG 16 WP 3 and ISO/IEC JTC 1/SC 29/WG 11, 13th Meeting: Marrakech, MA, Document: JVET-M0096-v3, total 4 pages (Jan. 9-18, 2019).

Bross et al., "Versatile Video Coding (Draft 3)," Joint Video Experts Team (JVET) of ITU-T SG 16 WP 3 and ISO/IEC JTC 1/SC 29/WG 11, 12th Meeting: Macao, CN, Document: JVET-L1001-v2, total 174 pages (Oct. 3-12, 2018).

Dias et al., "CE10-related: Multi-Hypothesis Intra with Weighted Combination," Joint Video Experts Team (JVET) of ITU-T SG 16 WP 3 and ISO/IEC JTC 1/SC 29/WG 11, 13th Meeting: Marrakech, MA, Document: JVET-M0454-v1, total 4 pages (Jan. 9-18, 2019).

"Series H: Audiovisual and Multimedia Systems, Infrastructure of audiovisual services-Coding of moving video, Advanced video coding for generic audiovisual services," ITU-T H.264(Apr. 2017), total 812 pages, International Telecommunication Union, Geneva, Switzerland (Apr. 2017).

"Series H: Audiovisual and Multimedia Systems Infrastructure of audiovisual services-Coding of moving video, High efficiency video coding," ITU-T H.265(Feb. 2018), total 692 pages, International Telecommunication Union, Geneva, Switzerland (Feb. 2018).

Liao et al., "CE10: Triangular prediction unit mode (CE10.3.1 and CE10.3.2)," Joint Video Exploration Team (JVET) of ITU-T SG 16 WP 3 and ISO/IEC JTC 1/SC 29/WG 11, 11th Meeting: Ljubljana, SI, Document: JVET-K0144-v1, Total 6 pages (Jul. 10-18, 2018).

Esenlik et al., "Non-CE4: Geometrical partitioning for inter blocks," Joint Video Experts Team (JVET) of ITU-T SG 16 WP 3 and ISO/IEC JTC 1/SC 29/WG 11, 15th Meeting: Gothenburg, SE, Document: JVET-O0489, Total 9 pages (Jul. 3-12, 2019).

JCT-VC, "Test Model under Consideration," Joint Collaborative Team on Video Coding (JCT-VC) of ITU-T SG 16 WP 3 and ISO/IEC JTC1/SC29/WG11, 1st Meeting: Dresden, DE, JCTVC-A205, Total 30 pages, International Union of Telecommunication, Geneva, Switzerland (Apr. 15-23, 2010).

Yuan et al., "A New Transform Structure for Geometry Motion Partitioning in Video Coding," Journal of Shanghai University (Natural Science), vol. 19, No. 3, Total 5 pages (Jun. 2013). With an English abstract.

* cited by examiner

| idx | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| GeoFilter[idx] | 4 | 5 | 5 | 5 | 5 | 5 | 6 | 6 | 6 | 6 | 7 | 7 | 7 | 7 | 8 |

Table 17-1

| idx | 0 | 1 | 2 | 3 | 4 | 5 | 6 | 7 |
|---|---|---|---|---|---|---|---|---|
| GeoFilter[idx] | 4 | 5 | 5 | 6 | 6 | 7 | 7 | 8 |

Table 17-2

| idx | 0 | 1 | 2 | 3 | 4 |
|---|---|---|---|---|---|
| GeoFilter[idx] | 4 | 5 | 6 | 7 | 8 |

Table 17-3

| idx | 0 | 1 | 2 |
|---|---|---|---|
| GeoFilter[idx] | 4 | 6 | 8 |

Table 17-4

FIG. 15

ADAPTIVE FILTER STRENGTH SIGNALLING FOR GEOMETRIC PARTITION MODE

CROSS-REFERENCE TO RELATED APPLICATIONS

This application is a continuation of International Application No. PCT/CN2020/097069, filed on Jun. 19, 2020, which claims priority to International Patent Application No. PCT/EP2019/066514, filed on Jun. 21, 2019 and International Patent Application No. PCT/EP2019/066876, filed on Jun. 25, 2019. All of the aforementioned patent applications are hereby incorporated by reference in their entireties.

FIELD

Embodiments of the present application generally relate to picture processing, and more particularly, to merge list construction.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, compression and decompression techniques that improve compression ratio with little to no sacrifice in picture quality are desirable.

SUMMARY

Embodiments of the present application provide apparatuses and methods for encoding and decoding video data.

A first embodiment of the present disclosure provides a method of video coding implemented by a decoding device or an encoding device, comprising dividing a current block into at least two sub-blocks; obtaining a first prediction mode for a first sub-block in the at least two sub-blocks and obtaining a second prediction mode for a second sub-block in the at least two sub-blocks; obtaining a first prediction value for a sample in the current block according to the first prediction mode and obtaining a second prediction value for the sample in the current block according to the second prediction mode; obtaining an indicator, wherein the indicator includes information on performing a blending operation for the sample in the current block; and obtaining a combined prediction value for the sample in the current block, based on the indicator, the first prediction value and the second prediction value.

Applying a blending operation may eliminate any artefacts (edgy or jugged appearance) along a separation line dividing the current block into the first and second sub-blocks.

The method may further comprise determining, based on the indicator, whether the blending operation is performed for the sample in the current block. Upon determination that the blending operation is not performed for the sample in the current block, the combined prediction value for the sample may be obtained either as the first prediction value or as the second prediction value.

Adaptively determining whether a blending operation is applied may avoid excessive blurring by the blending operation, especially if the original video has sharp edges. As a result, the subjective quality (viewing experience) and compression efficiency of the video may be increased.

The method may further comprise selecting, based on the indicator, the blending operation from a plurality of blending operations.

The indicator may be coded in a bitstream of a video sequence. The indicator may comprise a first indicator indicating which blending operation is selected, and a second indicator indicating presence of the first indicator in the bitstream.

The indicator may be encoded in a sequence parameter set or a picture parameter set or an adaptation parameter set. Alternatively, the indicator may be encoded in a picture header or a tile header or a tile group header or a slice header.

The obtaining a combined prediction value for the sample in the current block based on the indicator, the first prediction value and the second prediction value, may comprise determining a sample distance for the sample in the current block with regard to a separation line dividing the current block into the first sub-block and the second sub-block; calculating a first weight value according to the sample distance for the sample in the current block and the blending operation which is indicated by the indicator; and obtaining the combined prediction value for the sample in the current block according to the first weight value, the first prediction value and the second prediction value.

Calculating the first weight value according to the sample distance allows defining a width of the filtering/blending operation.

The blending operation may be implemented as sampleWeight1=Clip3(0,2*K,sample_dist), wherein sampleWeight1 is the first weight value, sample_dist is a value of the sample distance for the sample in the current block with an offset of K added, K is an integer value with a value greater than 0, and
wherein the definition of function Clip3 is as follows:

$$Clip3(x, y, z) = \begin{cases} x; & z < x \\ y; & z > y \\ z; & \text{otherwise} \end{cases}.$$

K may be equal to 4.

Alternatively, the blending operation may be implemented as sampleWeight1=Clip3(0,2*K,f(sample_dist)), wherein sampleWeight1 is the first weight value, sample_dist is a value of the sample distance for the sample in the current block with an offset of K added, K is an integer value with a value greater than 0, and f( ) is a function; and wherein the definition of function Clip3 is as follows:

$$Clip3(x, y, z) = \begin{cases} x; & z < x \\ y; & z > y \\ z; & \text{otherwise} \end{cases}.$$

K may be equal to 4. The function f( ) can be any linear or non-linear function, for example comprising additions, multiplications, divisions, bit-shifts, clipping operations, taking the absolute value, or trigonometric functions or a combinations of those. In some examples, the function f( ) can be a division/addition/multiplication with a constant number operation, a right shifting with a constant amount operation, taking the absolute value operation or a clipping operation or a combination of those.

According to another alternative, the blending operation may be implemented as sampleWeight1=sample_dist==4?4:(sample_dist<4?0: 8), or as sampleWeight1=Clip3(0,8,(sample_dist−4)*K+ sample_dist);

wherein the sampleWeight1 is the first weight value, sample_dist is a value of the sample distance for the sample in the current block with an offset of 4 added, K is an integer with a value greater than 0, and wherein the definition of function Clip3 is as follows:

$$Clip3(x, y, z) = \begin{cases} x; & z < x \\ y; & z > y \\ z; & \text{otherwise} \end{cases}.$$

A higher value for K has the effect of making the overall blending operation narrower (e.g., less smoothing) and a smaller value for K has the effect of making the overall blending operation wider (e.g., more smoothing).

According to yet another alternative, the blending operation may be implemented as sampleWeight1=sample_dist==0?4:(sample_dist<0?0: 8), or as sampleWeight1=Clip3(0,8,sample_dist*K+sample_ dist+4);

wherein the sampleWeight1 is the first weight value, sample_dist is a value of the sample distance for the sample in the current block, K is an integer with a value greater than 0, and wherein the definition of function Clip3 is as follows:

$$Clip3(x, y, z) = \begin{cases} x; & z < x \\ y; & z > y \\ z; & \text{otherwise} \end{cases}.$$

The above blending operations provide a symmetric filtering around the separation line.

According to yet another alternative, the blending operation may be implemented as sampleWeight1=geoFilter[idx];

wherein idx is obtained as a function of sample_dist, the sample_dist is a value of the sample distance for the sample in the current block, and geoFilter is a one-dimensional linear array of filter weights.

The obtaining the combined prediction value for the sample in the current block according to the first weight value, the first prediction value and the second prediction value may comprise obtaining a second weight value according to the first weight value; and obtaining the combined prediction value for the sample in the current block, by weighting the first prediction value and the second prediction value, according to the first weight value and the second weight value. The obtaining the combined prediction value for the sample in the current block may involve at least one of a rounding operation and a clipping operation.

Parameters specifying the separation line may be signaled in the bitstream of the video sequence. The parameters specifying the separation line may include at least one of an angle and a distance.

The blending operation may be implemented according to a lookup table.

The blending operation may be implemented according to a function, wherein an input of the function is a sample distance for the sample in the current block with regard to a separation line dividing the current block into the first sub-block and the second sub-block, and wherein an output of the function is a first weight value.

According to an aspect of the first embodiment, an encoder is provided comprising processing circuitry for carrying out any one of the methods according to the first embodiment.

According to a further aspect of the first embodiment, a decoder is provided comprising processing circuitry for carrying out any one of the methods according to the first embodiment.

According to a further aspect of the first embodiment, a computer program product is provided comprising instructions which, when the program is executed by a computer, cause the computer to carry out any one of the methods according to the first embodiment.

According to a further aspect of the first embodiment, a decoder is provided, comprising one or more processors; and a non-transitory computer-readable storage medium coupled to the one or more processors and storing instructions for execution by the one or more processors, wherein the instructions, when executed by the one or more processors, configure the decoder to carry out any one of the methods according to the first embodiment.

According to a further aspect of the first embodiment, an encoder is provided, comprising one or more processors; and a non-transitory computer-readable storage medium coupled to the one or more processors and storing instructions for execution by the one or more processors, wherein the instructions, when executed by the one or more processors, configure the encoder to carry out any one of the methods according to the first embodiment.

According to a further aspect of the first embodiment, a decoder or an encoder is provided, comprising a dividing module configured to divide a current block into at least two sub-blocks; a first obtaining module configured to obtain a first prediction mode for a first sub-block in the at least two sub-blocks and a second prediction mode for a second sub-block in the at least two sub-blocks, and to obtain a first prediction value for a sample in the current block according to the first prediction mode and a second prediction value for the sample in the current block according to the second prediction mode; a second obtaining module configured to obtain an indicator, wherein the indicator includes information on performing a blending operation for the sample in the current block; and a third obtaining module configured to obtain a combined prediction value for the sample in the current block, based on the indicator, the first prediction value and the second prediction value.

In an embodiment, a non-transitory storage medium which includes an encoded bitstream decoded by an image decoding device, the bit stream being generated by dividing a frame of a video signal or an image signal into a plurality blocks, and including a plurality of syntax elements, wherein the plurality of syntax elements comprises an indicator (syntax) according to any one of the above embodiments and implementation is disclosed.

A second embodiment of the present disclosure provides a method of coding implemented by a decoding device, comprising dividing a current block into at least two sub-blocks; obtaining a first prediction mode for a first sub-block in the at least two sub-blocks, obtaining a second prediction mode for a second sub-block in the at least two sub-blocks; obtaining a first prediction value for a sample in the current block according to the first prediction mode, obtaining a second prediction value for the sample in the current block according to the second prediction mode; obtaining a value of an indicator, the value of the indicator indicates a blending operation which is performed for the sample in the current block; and obtaining a combined prediction value for the sample in the current block, according to the value of the indictor, the first prediction value and the second prediction value.

The obtaining a combined prediction value for the sample in the current block according to the value of the indictor, the first prediction value and the second prediction value, may comprise calculating a first weight value according to a sample distance for the sample in the current block and the blending operation which is indicated by the value of the indicator; and obtaining the combined prediction value for the sample in the current block according to the first weight value, the first prediction value and the second prediction value.

The obtaining the combined prediction value for the sample in the current block according to the first weight value, the first prediction value and the second prediction value may comprise obtaining a second weight value according to the first weight value; and obtaining the combined prediction value for the sample in the current block, by weighting the first prediction value and the second prediction value, according the first weight value and the second weight value.

The blending operation may be implemented according to a lookup table. Alternatively, the blending operation may be implemented according to a function, wherein an input of the function is a sample distance for the sample in the current block, and an output of the function is a first weight value.

The blending operation may be implemented as, sampleWeight1=Clip3(0,8,sample_dist), wherein the sampleWeight1 is a first weight value, sample_dist is a value of a sample distance for the sample in the current block,
where the definition of function Clip3 is as follows:

$$Clip3(x, y, z) = \begin{cases} x; & z < x \\ y; & z > y \\ z; & \text{otherwise} \end{cases}$$

Alternatively, the blending operation may be implemented as, sampleWeight1=Clip3(0,8,f(sample_dist)), wherein the sampleWeight1 is a first weight value, sample_dist is a value of a sample distance for the sample in the current block,
where the definition of function Clip3 is as follows:

$$Clip3(x, y, z) = \begin{cases} x; & z < x \\ y; & z > y \\ z; & \text{otherwise} \end{cases}$$

The function f( ) can be any linear or non-linear function, for example comprising additions, multiplications, divisions, bit-shifts, clipping operations, taking the absolute value, or trigonometric functions or a combinations of those. In some examples, the function f( ) can be a division/addition/multiplication with a constant number operation, a right shifting with a constant amount operation, taking the absolute value operation or a clipping operation or a combination of those.

Alternatively, the blending operation may be implemented as,

"sampleWeight=sample_dist==4?4:sample_dist<4?0: 8", or

"sampleWeight=Clip3(0,8,(sample_dist−4)*K+ sample_dist)";

wherein the sampleWeight is a weight value, the sample_dist is a value of a sample distance for the sample in the current block, K is an integer with a value greater than 0, where the definition of function Cli3 is as follows:

$$Clip3(x, y, z) = \begin{cases} x; & z < x \\ y; & z > y \\ z; & \text{otherwise} \end{cases}$$

The value of the indicator may be encoded in a sequence parameter set or a picture parameter set or an adaptation parameter set. Alternatively, the value of the indicator may be encoded in a picture header or a tile header or a tile group header or a slice header.

According to an aspect of the second embodiment, a decoder is provided comprising processing circuitry for carrying out any one of the methods according to the second embodiment.

According to a further aspect of the second embodiment, a computer program product is provided comprising a program code for performing any one of the methods according to the second embodiment.

According to a further aspect of the second embodiment, a decoder is provided, comprising one or more processors; and a non-transitory computer-readable storage medium coupled to the processors and storing programming for execution by the processors, wherein the programming, when executed by the processors, configures the decoder to carry out any one of the methods according to the second embodiment.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the disclosure are described in more detail with reference to the attached figures and drawings, in which:

FIG. 15 shows examples for blending functions;

Figure 1A:
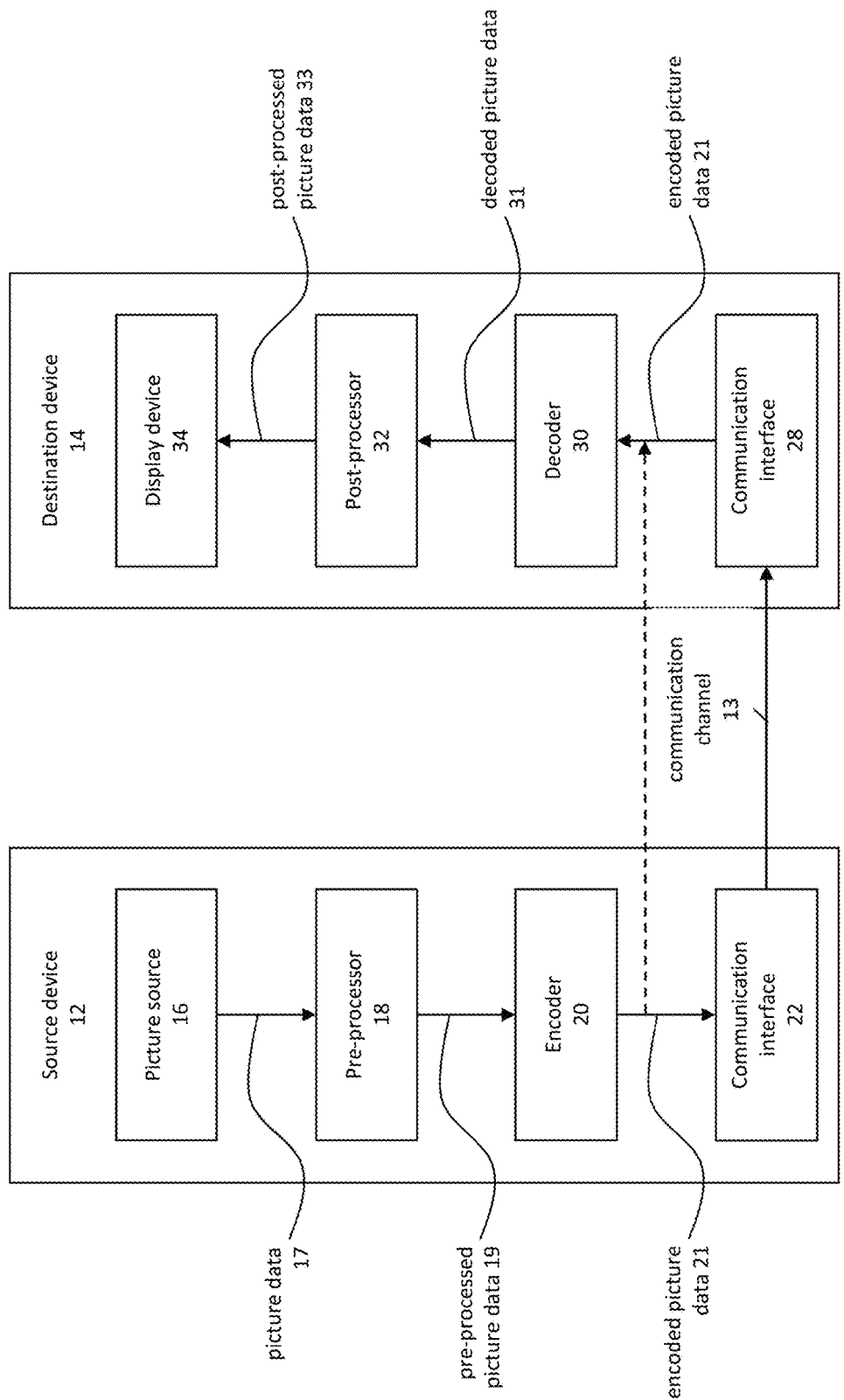
FIG. 1A is a block diagram showing an example of a video coding system configured to implement embodiments of the disclosure.

In the following, identical reference signs refer to identical or at least functionally equivalent features if not explicitly specified otherwise.

DETAILED DESCRIPTION

In the following description, reference is made to the accompanying figures, which form part of the disclosure, and which show, by way of illustration, specific aspects of exemplary embodiments of the disclosure or specific aspects in which exemplary embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture", the term "frame" or "image" may be used as synonyms in the field of video coding. Video coding (or coding in general) comprises two parts: video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as Coding and Decoding (CODEC).

In case of lossless video coding, the original video pictures can be reconstructed, i.e., the reconstructed video pictures have the same quality as the original video pictures (assuming no transmission loss or other data loss occurs during storage or transmission). In case of lossy video coding, further compression, e.g., by quantization, is performed, to reduce the amount of data representing the video pictures, which cannot be completely reconstructed at the decoder, i.e., the quality of the reconstructed video pictures is lower or worse compared to the quality of the original video pictures.

Several video coding standards belong to the group of "lossy hybrid video codecs" (i.e., combine spatial and temporal prediction in the sample domain and two-dimensional (2D) transform coding for applying quantization in the transform domain). Each picture of a video sequence is typically partitioned into a set of non-overlapping blocks and the coding is typically performed on a block level. In other words, at the encoder the video is typically processed, i.e., encoded, on a block (video block) level, e.g., by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e., coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g., a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21, e.g., to a destination device 14 for decoding the encoded picture data 13.

The source device 12 comprises an encoder 20, and may additionally, i.e., optionally, comprise a picture source 16, a pre-processor (or pre-processing unit) 18, e.g., a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 may be configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g., from red, green, blue (RGB) to YCbCr), color correction, or de-noising. It can be understood that the pre-processing unit 18 may be an optional component.

The video encoder 20 may be configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g., the destination device 14 or any other device, for storage or direct reconstruction.

The destination device 14 comprises a decoder 30 (e.g., a video decoder 30), and may additionally, i.e., optionally, comprise a communication interface or communication unit 28, a post-processor 32 (or post-processing unit 32) and a display device 34.

The communication interface 28 of the destination device 14 may be configured to receive the encoded picture data 21 (or any further processed version thereof), e.g., directly from the source device 12 or from any other source, e.g., a storage device, such as an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, e.g., a wired or wireless network or any combination thereof, or any kind of private and public network, or any kind of combination thereof.

The communication interface 22 may be configured to package the encoded picture data 21 into an appropriate format, e.g., packets, and/or process the encoded picture data using any kind of transmission encoding or processing for transmission over a communication link or communication network.

The communication interface 28, forming the counterpart of the communication interface 22, may be configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or as bi-directional communication interfaces, and may be configured to send and receive messages, e.g., to set up a connection, to acknowledge and exchange any other information related to the communication link and/or data transmission, such as encoded picture data transmission.

The decoder 30 may be configured to receive the encoded picture data 21 and provide decoded picture data 31 or a decoded picture 31 (further details will be described below, e.g., based on FIG. 3 or FIG. 5). The post-processor 32 of destination device 14 may be configured to post-process the decoded picture data 31 (also called reconstructed picture data), e.g., the decoded picture 31, to obtain post-processed picture data 33, such as a post-processed picture 33. The post-processing performed by the post-processing unit 32 may comprise any one or more of color format conversion (e.g., from YCbCr to RGB), color correction, trimming, or re-sampling, or any other processing, e.g., for preparing the decoded picture data 31 for display, e.g., by display device 34.

The display device 34 of the destination device 14 may be configured to receive the post-processed picture data 33 for displaying the picture, e.g., to a user or viewer. The display device 34 may be or comprise any kind of display for representing the reconstructed picture, such as an integrated or external display or monitor. The display may be a liquid crystal displays (LCD), an organic light emitting diodes (OLED) display, a plasma display, a projector, a micro light-emitting diode (LED) display, a liquid crystal on silicon (LCoS), a digital light processor (DLP) or any kind of other display.

Although FIG. 1A depicts the source device 12 and the destination device 14 as separate devices, embodiments of devices may also comprise both devices or both functionalities, i.e., the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
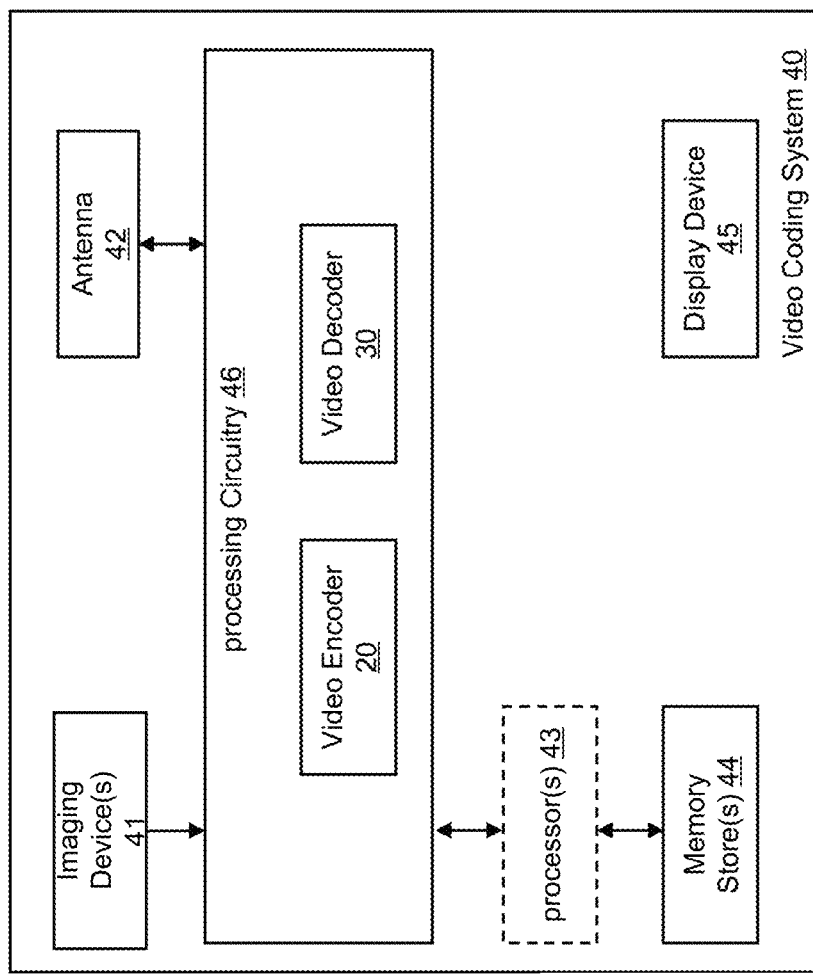
FIG. 1B is a block diagram showing another example of a video coding system configured to implement embodiments of the disclosure.

The encoder 20 (e.g., a video encoder 20) or the decoder 30 (e.g., a video decoder 30) or both, encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Video encoder 20 and video decoder 30 may be integrated as part of a combined encoder/decoder (CODEC) in a single device, for example, as shown in FIG. 1B.

The video coding system 40 shown in FIG. 1B comprises a processing circuitry implementing both a video encoder 20 and a video decoder 30. In addition, one or more imaging devices 41, such as a camera for capturing real-world pictures, an antenna 42, one or more memory stores 44, one or more processors 43 and/or a display device 45, such the display device 34 described above, may be provided as part of the video coding system 40.

Source device 12 and destination device 14 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver devices, broadcast transmitter devices, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding systems (e.g., video encoding or video decoding) that do not necessarily include any data communication between the encoding and decoding devices. In other examples, data is retrieved from a local memory, streamed over a network, or the like. A video encoding device may encode and store data in memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of international telecommunication union-telecommunication (ITU-T) Video Coding Experts Group (VCEG) and international organization for standardization/international electrotechnical commission (ISO/IEC) Motion Picture Experts Group (MPEG). One of ordinary skill in the art will understand that embodiments of the disclosure are not limited to HEVC or VVC.

Encoder and Encoding Method

Figure 2:
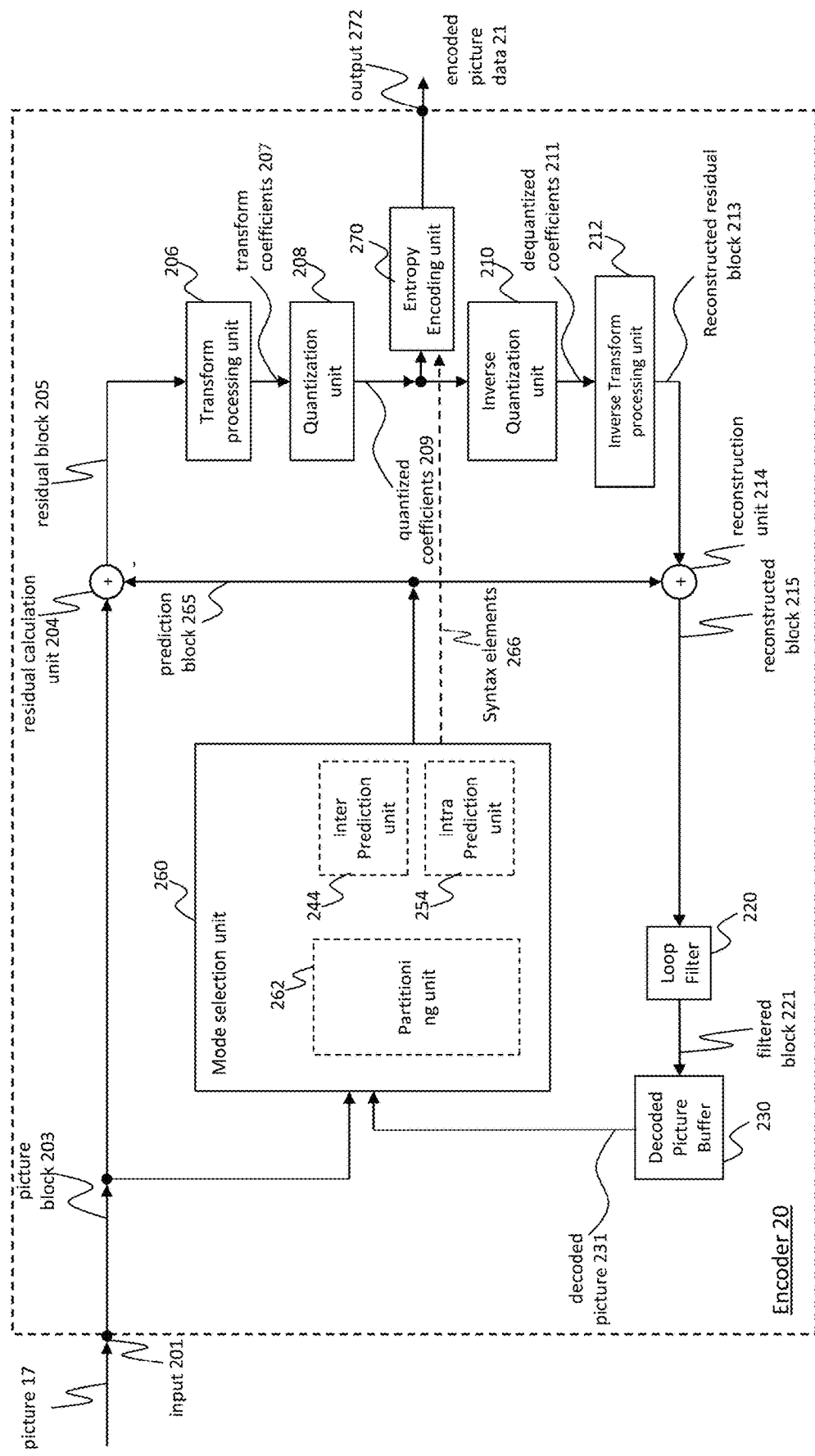
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and an inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. The inter prediction unit 244 may include a motion estimation unit and a motion compensation unit (not shown). A video encoder 20 as shown in FIG. 2 may also be referred to as a hybrid video encoder or a video encoder according to a hybrid video codec.

Figure 3:
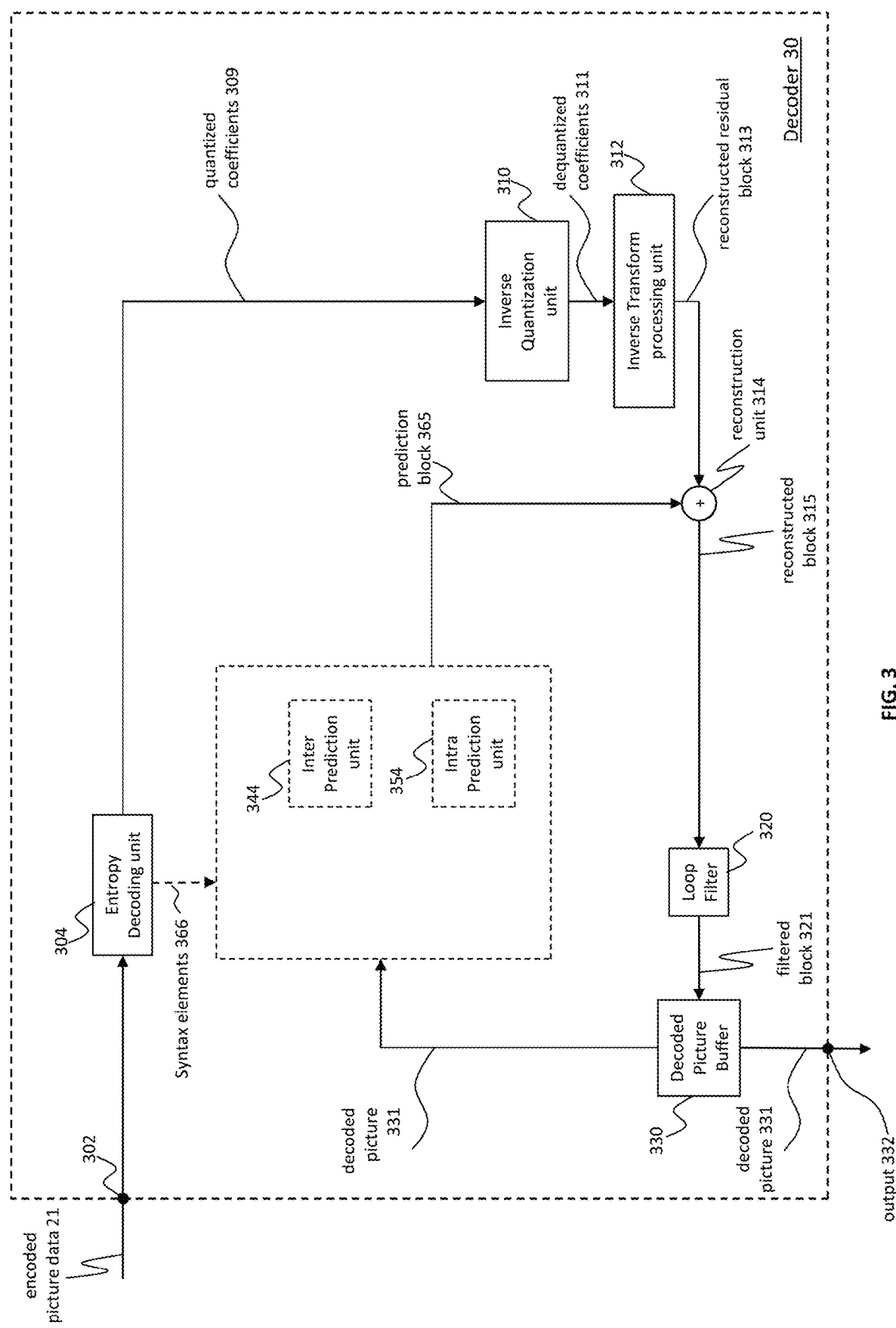
FIG. 3 is a block diagram showing an example structure of a video decoder configured to implement embodiments of the disclosure.

The residual calculation unit 204, the transform processing unit 206, the quantization unit 208, and the mode selection unit 260 may be referred to as forming a forward signal path of the encoder 20, whereas the inverse quantization unit 210, the inverse transform processing unit 212, the reconstruction unit 214, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g., via input 201, a picture 17 (or picture data 17), e.g., a picture of a sequence of pictures forming a video or video sequence. The received picture or picture data may also be a pre-processed picture 19 (or pre-processed picture data 19). For the sake of simplicity the following description refers to the picture 17. The picture 17 may also be referred to as a current picture or a picture to be coded (in particular, in video coding to distinguish the current picture from other pictures, e.g., previously encoded and/or decoded pictures of the same video sequence, i.e., the video sequence which also comprises the current picture).

A (digital) picture is or can be regarded as a two-dimensional array or matrix of samples with intensity values. A sample in the array may also be referred to as pixel (short form of picture element) or a pel. The number of samples in the horizontal and vertical direction (or axis) of the array or picture defines the size and/or resolution of the picture. For representation of color, typically three color components are employed, i.e., the picture may be represented as or include three sample arrays. In RBG format or color space, a picture comprises a corresponding red, green and blue sample array. However, in video coding each pixel is typically represented in a luminance and chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa. The process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (according to H.265/high efficiency video coding (HEVC) and versatile video coding (VVC)). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g., one, several or all blocks forming the picture 17. The picture block 203 may also be referred to as current picture block or picture block to be coded.

Like the picture 17, the picture block 203 is or can be regarded as a two-dimensional array or matrix of samples with intensity values (sample values), although of smaller dimension than the picture 17. In other words, the block 203 may comprise, e.g., one sample array (e.g., a luma array in case of a monochrome picture 17, or a luma or chroma array in case of a color picture) or three sample arrays (e.g., a luma and two chroma arrays in case of a color picture 17) or any other number and/or kind of arrays depending on the color format applied. The number of samples in the horizontal and vertical direction (or axis) of the block 203 defines the size of the block 203. Accordingly, a block may, for example, comprise an M×N (M-column by N-row) array of samples, or an M×N array of transform coefficients.

Embodiments of the video encoder 20 as shown in FIG. 2 may be configured to encode the picture 17 block by block, e.g., the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

Transform

The transform processing unit 206 may be configured to apply a transform, such as a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g., by inverse transform processing unit 212 (and the corresponding inverse transform, e.g., by inverse transform processing unit 312 at video decoder 30) and corresponding scaling factors for the forward transform, e.g., by transform processing unit 206, at an encoder 20 may be specified accordingly.

Embodiments of the video encoder 20 (respectively, the transform processing unit 206) may be configured to output transform parameters, e.g., a type of transform or transforms, e.g., directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g., by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may, for example, be an index of a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g., by inverse quantization unit 210, may include multiplication by the quantization step size. Embodiments according to some standards, e.g., HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one exemplary implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

Embodiments of the video encoder 20 (respectively, the quantization unit 208) may be configured to output quantization parameters (QPs), e.g., directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g., an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as a transform block 213.

Reconstruction

The reconstruction unit 214 (e.g., adder or summer 214) is configured to add the transform block 213 (i.e., reconstructed residual block 213) to the prediction block 265 to obtain a reconstructed block 215 in the sample domain, e.g., by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit may be configured to smooth pixel transitions, or otherwise improve the video quality. The loop filter unit 220 may comprise one or more loop filters such as a de-blocking filter, a sample-adaptive offset (SAO) filter or one or more other filters, such as a bilateral filter, an adaptive loop filter (ALF), a sharpening, a smoothing filter or a collaborative filter, or any combination thereof. Although the loop filter unit 220 is shown in FIG. 2 as being an in-loop filter, in other configurations, the loop filter unit 220 may be implemented as a post loop filter. The filtered block 221 may also be referred to as a filtered reconstructed block 221.

Embodiments of the video encoder 20 (respectively, the loop filter unit 220) may be configured to output loop filter parameters (such as sample adaptive offset information), e.g., directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, i.e., decoded, pictures (and corresponding reference blocks and samples) and/or a partially reconstructed current picture (and corresponding reference blocks and samples), for example for inter prediction. The decoded picture buffer (DPB) 230 may also be configured to store one or more unfiltered reconstructed blocks 215, or in general unfiltered reconstructed samples, e.g., if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, such as an original block 203 (current block 203 of the current picture 17), and reconstructed picture data, such as filtered and/or unfiltered reconstructed samples or blocks of the same (current) picture and/or from one or a plurality of previously decoded pictures, e.g., from decoded picture buffer 230 or other buffers (e.g., line buffer, not shown). The reconstructed picture data is used as reference picture data for prediction, e.g., inter-prediction or intra-prediction, to obtain a prediction block 265 or predictor 265.

Mode selection unit 260 may be configured to determine or select a partitioning for a current block prediction mode (including no partitioning) and a prediction mode (e.g., an intra- or inter-prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g., from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e., select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which again form blocks), e.g., iteratively using quad-tree-partitioning (QT), binary-tree partitioning (BT) or triple-tree-partitioning (TT) or any combination thereof, and to perform the prediction for each of the block partitions or sub-blocks, wherein the mode selection comprises the selection of the tree-structure of the partitioned block 203 and the prediction modes are applied to each of the block partitions or sub-blocks.

In the following, the partitioning (e.g., by partitioning unit 262) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g., smaller blocks of square or rectangular size. These smaller blocks (which may also be referred to as sub-blocks) may be further partitioned into even smaller partitions. This is also referred to as tree-partitioning or hierarchical tree-partitioning, wherein a root block, e.g., at root tree-level 0 (hierarchy-level 0, depth 0), may be recursively partitioned, e.g., partitioned into two or more blocks of a next lower tree-level, e.g., nodes at tree-level 1 (hierarchy-level 1, depth 1), wherein these blocks may be again partitioned into two or more blocks of a next lower level, e.g., tree-level 2 (hierarchy-level 2, depth 2), etc. until the partitioning is terminated, e.g., because a termination criterion is fulfilled, e.g., a maximum tree depth or minimum block size is reached. Blocks which are not further partitioned are also referred to as leaf-blocks or leaf nodes of the tree. A tree using partitioning into two partitions is referred to as a binary-tree (BT), a tree using partitioning into three partitions is referred to as a ternary-tree (TT), and a tree using partitioning into four partitions is referred to as a quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), a prediction unit (PU), or a transform unit (TU) and/or to the corresponding blocks, e.g., a coding tree block (CTB), a coding block (CB), a transform block (TB) or a prediction block (PB).

For example, a coding tree unit (CTU) may be or comprise a CTB of luma samples and two corresponding CTBs of chroma samples of a picture that has three sample arrays, or a CTB of samples of a monochrome picture or a picture that is coded using three separate color planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples and two corresponding coding blocks of chroma samples of a picture that has three sample arrays, or a coding block of samples of a monochrome picture or a picture that is coded using three separate color planes and syntax structures used to code the samples. Correspondingly, a coding block (CB) may be an M×N block of samples for some values of M and N such that the division of a CTB into coding blocks is a partitioning.

In some embodiments, e.g., according to HEVC, a coding tree unit (CTU) may be split into CUs by using a quad-tree structure denoted as a coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU.

In embodiments, e.g., according to the latest video coding standard currently in development, which is referred to as Versatile Video Coding (VVC), quad-tree and binary-tree (QTBT) partitioning is used to partition a coding block. In the QTBT block structure, a CU can have either a square or rectangular shape. For example, a coding tree unit (CTU) is first partitioned by a quad-tree structure. The quad-tree leaf nodes are further partitioned by a binary-tree or ternary (or triple)-tree structure. The partitioning tree leaf nodes are called coding units (CUs), and that partition is used for prediction and transform processing without any further partitioning. This means that the CU, PU and TU have the same block size in the QTBT coding block structure. In parallel, multiple partitions, for example, triple-tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g., pre-determined) prediction modes. The set of prediction modes may comprise intra-prediction modes and/or inter-prediction modes.

Intra-Prediction

The set of intra-prediction modes may comprise 35 different intra-prediction modes, such as non-directional modes like direct current (DC) (or mean) mode and planar mode, or directional modes, e.g., as defined in HEVC, or may comprise 67 different intra-prediction modes, such as non-directional modes like DC (or mean) mode and planar mode, or directional modes, e.g., as defined for VVC.

The intra-prediction unit 254 is configured to use reconstructed samples of neighboring blocks of the same current picture to generate an (intra-)prediction block 265 according to an intra-prediction mode from the set of intra-prediction modes.

The intra-prediction unit 254 (or in general the mode selection unit 260) may be further configured to output intra-prediction parameters (or in general information indicative of the selected intra-prediction mode for the block) to the entropy encoding unit 270 in the form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e., previous, at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, such as half/semi-pel and/or quarter-pel interpolation, or not.

In addition to the above prediction modes, skip mode and/or direct mode may be applied.

The inter-prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, such as reconstructed blocks of one or a plurality of previously decoded pictures 231, for motion estimation. By way of example, a video sequence may comprise the current picture and the previously decoded pictures 231, or in other words, the current picture and the previously decoded pictures 231 may be part of or form a sequence of pictures forming a video sequence.

The encoder 20 may be configured to select a reference block from a plurality of reference blocks of the same or different pictures of the plurality of previously decoded pictures and provide a reference picture (or reference picture index) and/or an offset (spatial offset) between the position (x, y coordinates) of the reference block and the position of the current block as inter-prediction parameters to the motion estimation unit. This offset is also called motion vector (MV).

The motion compensation unit may be configured to obtain, e.g., receive, an inter-prediction parameter and to perform inter-prediction based on or using the inter-prediction parameter to obtain an (inter-)prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g., a variable length coding (VLC) scheme, a context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter-prediction parameters, intra-prediction parameters, loop filter parameters and/or other syntax elements to obtain encoded picture data 21 which can be output via the output 272, e.g., in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of the present application. The video decoder 30 is configured to receive encoded picture data 21 (e.g., encoded bitstream 21), e.g., encoded by encoder 20, to obtain a decoded picture 331. The encoded picture data or bitstream comprises information for decoding the encoded picture data, e.g., data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g., a summer 314), a loop filter 320, a decoded picture buffer (DBP) 330, an inter-prediction unit 344 and an intra-prediction unit 354. Inter-prediction unit 344 may be or include a motion compensation unit. Video decoder 30 may, in some examples, perform a decoding pass generally reciprocal to the encoding pass described with respect to video encoder 20 of FIG. 2.

As explained with regard to the encoder 20, the inverse quantization unit 210, the inverse transform processing unit 212, the reconstruction unit 214, the loop filter 220, the decoded picture buffer (DPB) 230, the inter-prediction unit 244 and the intra-prediction unit 254 are also referred to as forming the "built-in decoder" of video encoder 20. Accordingly, the inverse quantization unit 310 may be identical in function to the inverse quantization unit 210, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters 366, such as any or all of inter-prediction parameters (e.g., reference picture index and motion vector), intra-prediction parameters (e.g., intra-prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter-prediction parameters, intra-prediction parameters and/or other syntax elements to the mode selection unit and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general, information related to the inverse quantization) and quantized coefficients from the encoded picture data 21 (e.g., by parsing and/or decoding, e.g., by entropy decoding unit 304) and to apply, based on the quantization parameters, an inverse quantization to the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 313 in the sample domain. The reconstructed residual blocks 313 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g., by entropy decoding unit 304) to determine the transform to be applied to the dequantized coefficients 311.

Reconstruction

The reconstruction unit 314 (e.g., adder or summer 314) may be configured to add the reconstructed residual block 313, to the prediction block 365 to obtain a reconstructed block 315 in the sample domain, e.g., by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g., to smooth pixel transitions, or otherwise improve the video quality. The loop filter unit 320 may comprise one or more loop filters such as a de-blocking filter, a sample-adaptive offset (SAO) filter or one or more other filters, e.g., a bilateral filter, an adaptive loop filter (ALF), a sharpening, a smoothing filter or a collaborative filter, or any combination thereof. Although the loop filter unit 320 is shown in FIG. 3 as being an in-loop filter, in other configurations, the loop filter unit 320 may be implemented as a post loop filter.

Decoded Picture Buffer

The decoded video blocks 321 of a picture are then stored in the decoded picture buffer 330, which stores the decoded pictures 331 as reference pictures for subsequent motion compensation for other pictures and/or for output or respectively display.

The decoder 30 is configured to output the decoded picture 311, e.g., via output 312, for presentation or viewing to a user.

Prediction

The inter-prediction unit 344 may be identical to the inter-prediction unit 244 (in particular, to the motion compensation unit) and the intra-prediction unit 354 may be identical to the intra-prediction unit 254 in function, and performs split or partitioning decisions and prediction based on the partitioning and/or prediction parameters or respective information received from the encoded picture data 21 (e.g., by parsing and/or decoding, e.g., by entropy decoding unit 304). The mode selection unit may be configured to perform the prediction (intra- or inter-prediction) per block based on reconstructed pictures, blocks or respective samples (filtered or unfiltered) to obtain the prediction block 365.

When the video slice or picture is coded as an intra-coded (I) slice, intra-prediction unit 354 of mode application unit 360 is configured to generate prediction block 365 for a picture block of the current video slice based on a signaled intra-prediction mode and data from previously decoded blocks of the current picture. When the video slice or picture is coded as an inter-coded (i.e., B, or P) slice, inter-prediction unit 344 (e.g., motion compensation unit) of mode selection unit is configured to produce prediction block 365 for a video block of the current video slice based on the motion vectors and other syntax elements received from entropy decoding unit 304. For inter-prediction, the prediction blocks may be produced from one of the reference pictures within one of the reference picture lists. Video decoder 30 may construct the reference picture lists, List 0 and List 1, using default construction techniques based on reference pictures stored in DPB 330.

The mode selection unit is configured to determine the prediction information for a video/picture block of the current video slice by parsing the motion vectors and other syntax elements, and use the prediction information to produce the prediction blocks for the current video block being decoded. For example, the mode selection unit uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-coded video block of the slice, inter-prediction status for each inter-coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as clip or shift, may be performed on the processing result of the interpolation filtering, motion vector derivation or loop filtering.

It should be noted that further operations may be applied to the derived motion vectors of the current block (including but not limited to control point motion vectors of affine mode, sub-block motion vectors in affine, planar, alternative temporal motion vector prediction (ATMVP) modes, temporal motion vectors, and so on). For example, the value of a motion vector is constrained to a predefined range according to its representing bit number. If the representing bit number of the motion vector is bitDepth, then the range is $-2^{\wedge}(\text{bitDepth}-1) \sim 2^{\wedge}(\text{bitDepth}-1)-1$, where "^" means exponentiation. For example, if bitDepth is set equal to 16, the range is $-32768 \sim 32767$; if bitDepth is set equal to 18, the range is $-131072 \sim 131071$. The following description provides two methods for constraining the motion vector.

Method 1: remove the overflow most significant bit (MSB) by the following operations:

$$ux=(mvx+2^{bitDepth})\%2^{bitDepth} \qquad (1)$$

$$mvx=(ux>=2^{bitDepth-1})?(ux-2^{bitDepth}):ux \qquad (2)$$

$$uy=(mvy+2^{bitDepth})\%2^{bitDepth} \qquad (3)$$

$$mvy=(uy>=2^{bitDepth-1})?(uy-2^{bitDepth}):uy \qquad (4)$$

where mvx is a horizontal component of a motion vector of an image block or a sub-block, mvy is a vertical component of a motion vector of an image block or a sub-block, and ux and uy indicate respective intermediate values.

For example, if the value of mvx is $-32769$, after applying formulae (1) and (2), the resulting value is 32767. In a computer system, decimal numbers are stored as two's complements. The two's complement of $-32769$ is 1, 0111, 1111,1111,1111 (17 bits). Then, the MSB is discarded, so the resulting two's complement is 0111,1111,1111,1111 (decimal number is 32767), which is the same as the output by applying formulae (1) and (2).

$$ux = (mvpx + mvdx + 2^{bitDepth}) \% 2^{bitDepth} \qquad (5)$$

$$mvx = (ux \geq 2^{bitDepth-1})?(ux - 2^{bitDepth}) : ux \qquad (6)$$

$$uy = (mvpy + mvdy + 2^{bitDepth}) \% 2^{bitDepth} \qquad (7)$$

$$mvy = (uy \geq 2^{bitDepth-1})?(uy - 2^{bitDepth}) : uy \qquad (8)$$

The operations may be applied during the sum of the motion vector predictor mvp and the motion vector difference mvd, as shown in formulae (5) to (8).

Method 2: remove the overflow MSB by clipping the value:

$$vx = \text{Clip3}(-2^{bitDepth-1}, 2^{bitDepth-1} - 1, vx)$$

$$vy = \text{Clip3}(-2^{bitDepth-1}, 2^{bitDepth-1} - 1, vy)$$

where vx is a horizontal component of a motion vector of an image block or a sub-block, vy is a vertical component of a motion vector of an image block or a sub-block; x, y and z respectively correspond to three input values of the MV clipping process, and the definition of the function Clip3 is as follows:

$$\text{Clip3}(x, y, z) = \begin{cases} x; & z < x \\ y; & z > y \\ z; & \text{otherwise} \end{cases}$$

The operation "?" is usually used as a shortcut to represent an "if . . . else" condition. For example "X<K?X=1:X=0" can be interpreted as "if X is smaller than K, X is set equal to 1, else (if X is not smaller than K) X is set equal to 0".

Figure 4:
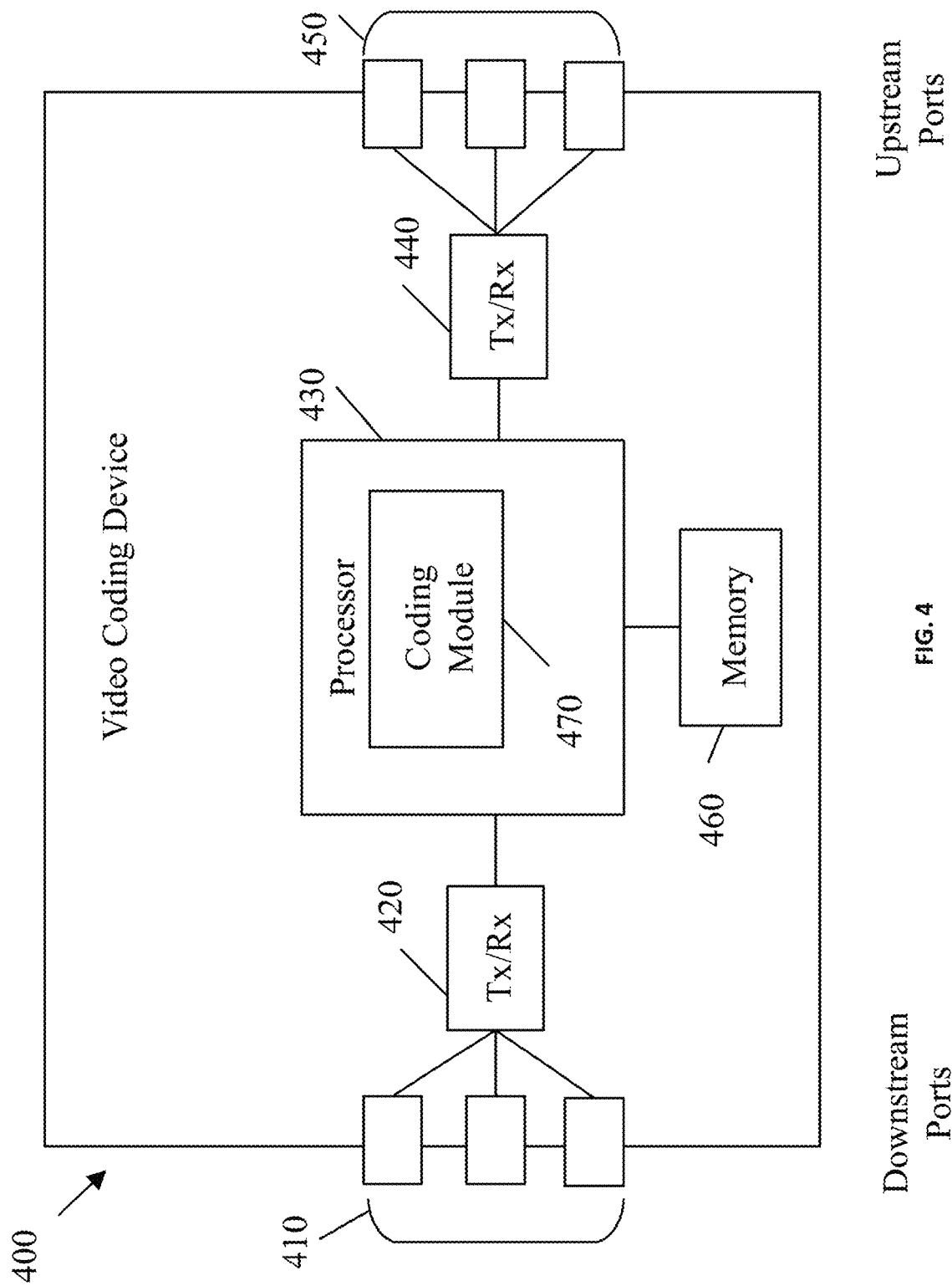
FIG. 4 is a block diagram illustrating an example of an encoding apparatus or a decoding apparatus.

FIG. 4 is a schematic diagram of a video coding device 400 according to an embodiment of the present disclosure. The video coding device 400 is suitable for implementing the disclosed embodiments as described below. In an embodiment, the video coding device 400 may be a decoder such as video decoder 30 of FIG. 1A or an encoder such as video encoder 20 of FIG. 1A.

The video coding device 400 may comprise ingress ports 410 (or input ports 410) and one or more receiver units (Rx) 420 for receiving data; a processor, logic unit, or central processing unit (CPU) 430 to process the data; one or more transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 may be implemented by hardware and software. The processor 430 may be implemented as one or more CPU chips, cores (e.g., as a multi-core processor), FPGAs, ASICs, and DSPs. The processor 430 may be in communication with the ingress ports 410, the receiver units 420, the transmitter units 440, egress ports 450, and the memory 460. The processor 430 may comprise a coding module 470. The coding module 470 implements the disclosed embodiments described above and below. For instance, the coding module 470 may implement, process, prepare, or provide the various coding operations. The inclusion of the coding module 470 therefore provides a substantial improvement to the functionality of the video coding device 400 and effects a transformation of the video coding device 400 to a different state. Alternatively, the coding module 470 may be implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
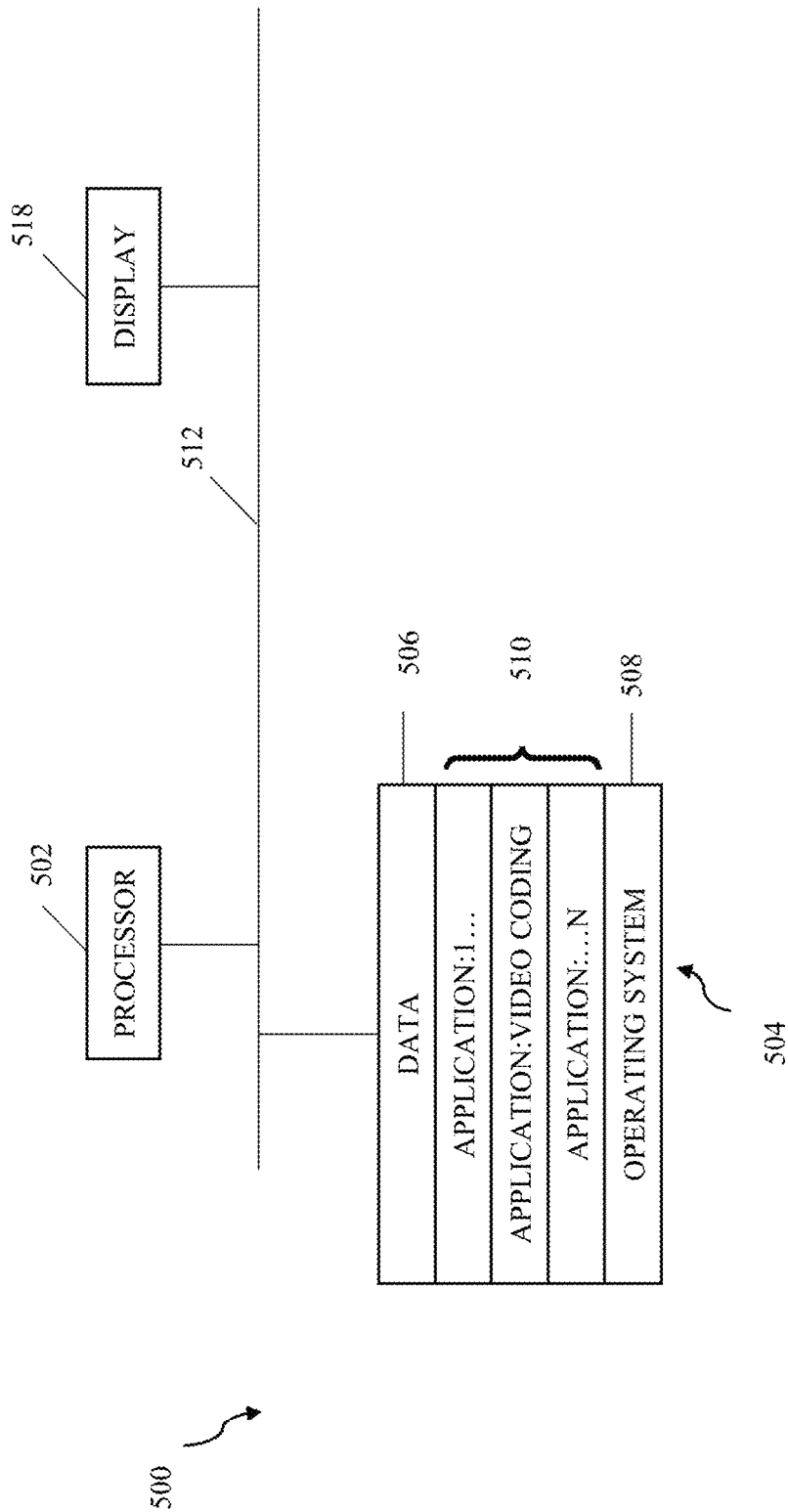
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described herein. For example, the application programs 510 can include applications 1 through N, which further include a video coding application that performs the methods described herein.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, a secondary storage (not shown) can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In an example about Merge Candidate List Construction according to ITU-T H.265, a merge candidate list is constructed based on the following candidates:
 1. up to four spatial candidates that are derived from five spatial neighboring blocks,
 2. one temporal candidate derived from two temporal, co-located blocks,
 3. additional candidates including combined bi-predictive candidates and,
 4. zero motion vector candidates.

Spatial Candidates

Figure 6B:
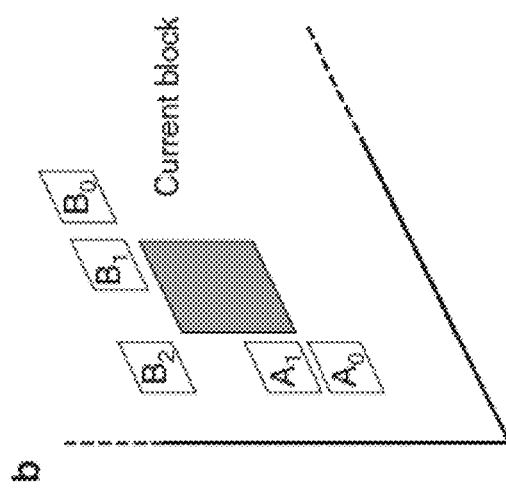
FIG. 6b illustrates an example of spatial neighbor blocks.

The motion information of spatial neighboring blocks is first added into the merge candidate list (in an example, the merge candidate list may be an empty list before the first motion vector is added into the merge candidate list) as motion information candidates. Here, the neighboring blocks that are considered to be inserted in the merge list are illustrated in FIG. 6b. For inter-prediction block merging, up to four candidates may be inserted in the merge list by sequentially checking A1, B1, B0, A0 and B2, in that order.

The motion information may contain all motion data including the information whether one or two reference picture lists are used as well as a reference picture index and a motion vector for each reference picture list.

In an example, after checking whether a neighboring block is available and contains motion information, some additional redundancy checks may be performed before taking all the motion data of the neighboring block as a motion information candidate. These redundancy checks can be divided into two categories for two different purposes:

Category 1: avoid having candidates with redundant motion data in the list,

Category 2: prevent merging two partitions that could be expressed by other means which would create redundant syntax.

Temporal Candidates

Figure 6A:
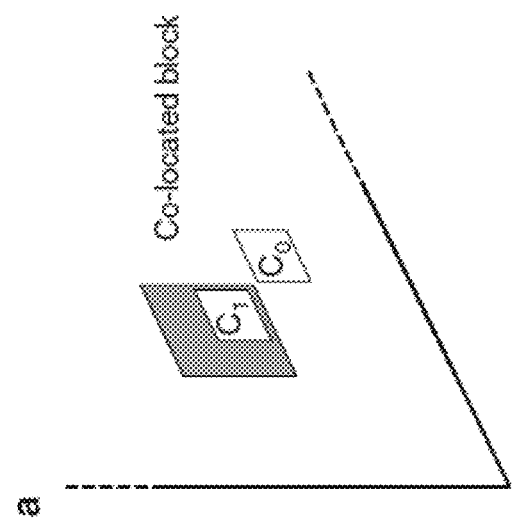
FIG. 6a illustrates an example of a co-located block.

FIG. 6a illustrates the location of the blocks from which temporal motion information candidates are retrieved. A co-located block is the block that has the same x-, y-coordinates as the current block, but is located in a different picture (one of the reference pictures). The temporal motion information candidates are added to the merge list if the list is not full (in an example, the merge list is not full when a quantity of candidates in the merge list is smaller than a threshold, for example, the threshold may be 4, 5, 6, and so on).

Generated Candidates

After insertion of spatial and temporal motion information candidates, if the merge list is still not full, generated candidates may be added to fill the list. The list size is indicated in the sequence parameter set and is fixed throughout the entire coded video sequence.

Bi-Prediction

A special mode of inter prediction is called "bi-prediction", where 2 motion vectors are used to predict a block. The motion vectors can point to the same or different reference pictures, where a reference picture can be indicated by a reference picture list identity (ID) or reference picture list index and a reference picture index. For example, a first motion vector may point to a first picture in the reference picture list L0 and a second motion vector may point to a first picture in the reference picture list L1. Two reference picture lists (for example, L0 and L1) may be maintained and the picture pointed to by the first motion vector may be selected from list L0 and the picture pointed to by the second motion vector may be selected from list L1.

In an example, if the motion information indicates bi-prediction, then the motion information may include two parts:

L0 part: A motion vector and a reference picture index that points to an entry, i.e., reference picture, in the reference picture list L0.

L1 part: A motion vector and a reference picture index that points to an entry in the reference picture list L1.

Picture Order Count (POC): A variable that is associated with each picture uniquely identifies the associated picture among all pictures in the Coded Video Sequence (CVS), and, when the associated picture is to be output from the decoded picture buffer, indicates the position of the associated picture in output order relative to the output order positions of the other pictures in the same CVS that are to be output from the decoded picture buffer.

Each of the reference picture lists L0 and L1 may include one or more reference pictures, each of which is identified with a POC. The association with each reference picture index and the POC value may be signaled in the bitstream. As an example, the L0 and L1 reference picture lists may include the following reference pictures:

| Reference Picture List | Reference (Picture) Index | POC |
| --- | --- | --- |
| L0 | 0 | 12 |
| L0 | 1 | 13 |
| L1 | 0 | 13 |
| L1 | 1 | 14 |

In the example above, the first entry (indicated by reference picture index 0) in reference picture list L1 is the reference picture with POC value 13. The second entry (indicated by reference picture index 1) in reference picture list L1 is the reference picture with POC value 14.

The merge list construction process in ITU-T H.265 and in VVC outputs a list of motion information candidates. The merge list construction process of VVC is described in the "8.3.2.2 Derivation process for luma motion vectors for merge mode" section of the document JVET-L1001_v2 Versatile Video Coding (Draft 3), which is publicly available under http://phenix.it-sudparis.eu/jvet/. The term motion information refers to the motion data that is necessary to perform the motion compensated prediction process. The motion information usually refers to the following information:

Whether the block applies uni-prediction or bi-prediction

The ID (reference picture index), and if applicable the reference picture list index, of the reference picture that is used in the prediction. (2 IDs if block applies bi-prediction).

Motion vector (2 motion vectors if block is bi-predicted)

Additional information

In VVC and H.265, the list of candidates that are output of the merge list construction include N candidate motion information. The number N is typically included in the bitstream and can be a positive integer number such as 5, 6 etc. The candidates that are included in the constructed merge list may include uni-prediction information or bi-prediction information. This means that the candidate that is selected from the merge list may indicate a bi-prediction operation.

Triangular Prediction Mode

The concept of the triangular prediction mode is to introduce a new triangular partition for motion compensated prediction. In an example shown in FIG. 7, two triangular prediction units are used for a CU, in either diagonal (shown on the left in FIG. 7) or inverse diagonal direction (shown on the right in FIG. 7). Each triangular prediction unit (PU) in the CU is inter-predicted, using a uni-prediction motion vector and reference frame (picture) index which are derived from a uni-prediction candidate list. An adaptive weighting or filtering process is performed to the diagonal edge after the samples that are associated with each triangular prediction unit have been predicted, for example by motion-compensation or intra-picture prediction. Then, the transform and quantization processes are applied to the whole CU. It is noted that this mode is only applied to skip mode and merge mode.

Figure 7:
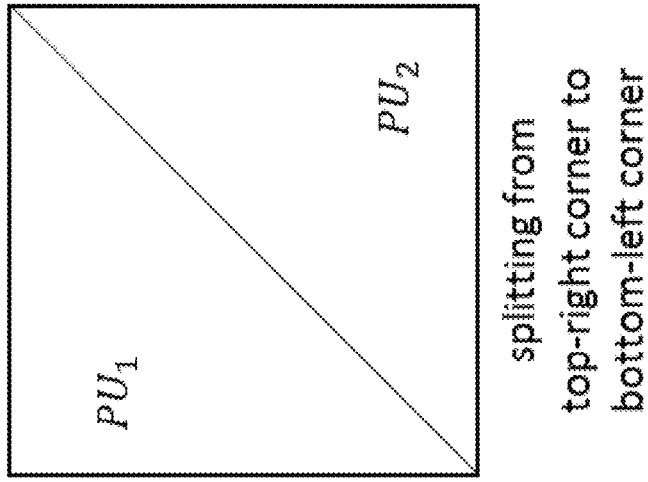
FIG. 7 illustrates examples of a triangular prediction mode.
Figure 7:
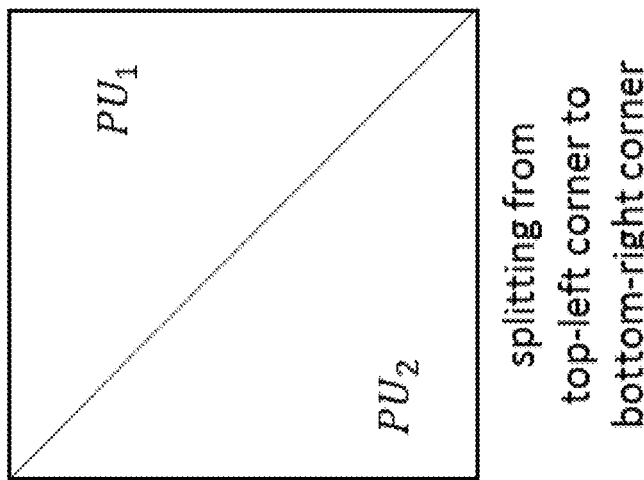

In the triangular prediction mode, a block is split into two triangular parts (as shown in FIG. 7), and each part can be predicted using one motion vector. A motion vector which is used to predict one triangle part (denoted with PU1) can be different from a motion vector which is used to predict the other triangle part (denoted with PU2). In an example, it is noted that each part can be predicted only using a single motion vector (uni-predicton), in order to reduce the complexity of performing the triangular prediction mode. In other words, the PU1 and PU2 may not be predicted using bi-prediction, which comprises two motion vectors.

Sub-Block Prediction Mode

Figure 8:
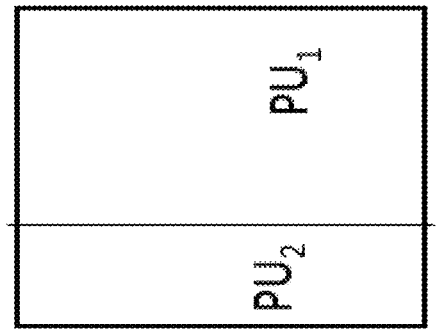
FIG. 8 illustrates examples of a sub-block prediction mode.
Figure 8:
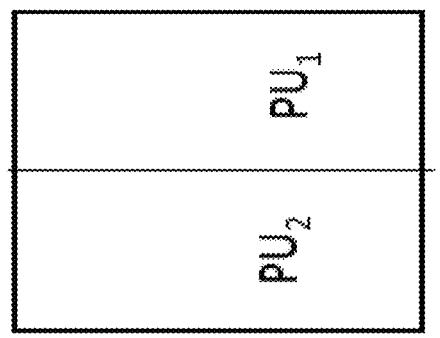
Figure 8:
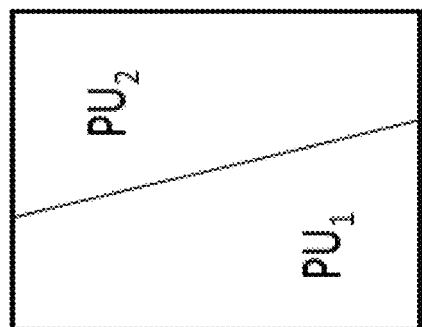

The triangular prediction mode is a special case of sub-block prediction, where a block is divided into two blocks. In the above examples, two directions for block division of a coding block are illustrated (45 degree and 135 degree partitions). Other partitioning angles and partitioning proportions for sub-block prediction are also possible (as for instance shown in FIG. 8).

In some examples, the block is split into 2 sub-blocks, and each part (sub-block) is predicted with uni-prediction.

In an example, according to a sub-block partition mode, the following steps are applied to obtain prediction samples for a block:

Step 1: divide a coding block into 2 sub-blocks, according to a geometric model. This geometric model may result in the splitting of the block at a separation line (for example, a straight line) as exemplified in FIGS. 9-12.

Step 2: obtain a first prediction mode for a first sub-block and a second prediction mode for a second sub-block. In an example, the first prediction mode may be different from the second prediction mode. In an example, a prediction mode (first prediction mode or second prediction mode) may be an inter-prediction mode. Information for an inter-prediction mode may comprise a reference picture index and a motion vector. In another example, the prediction mode may be an intra-prediction mode. Information for an intraprediction mode may comprises an intra-prediction mode index.

Step 3: Generate first prediction values and second prediction values, in particular for the entire coding block, using the first prediction mode and the second prediction mode, respectively.

Step 4: obtain the combined values of prediction samples by combining the first prediction values and the second prediction values, and according to the division which is disclosed in Step 1.

Figure 9:
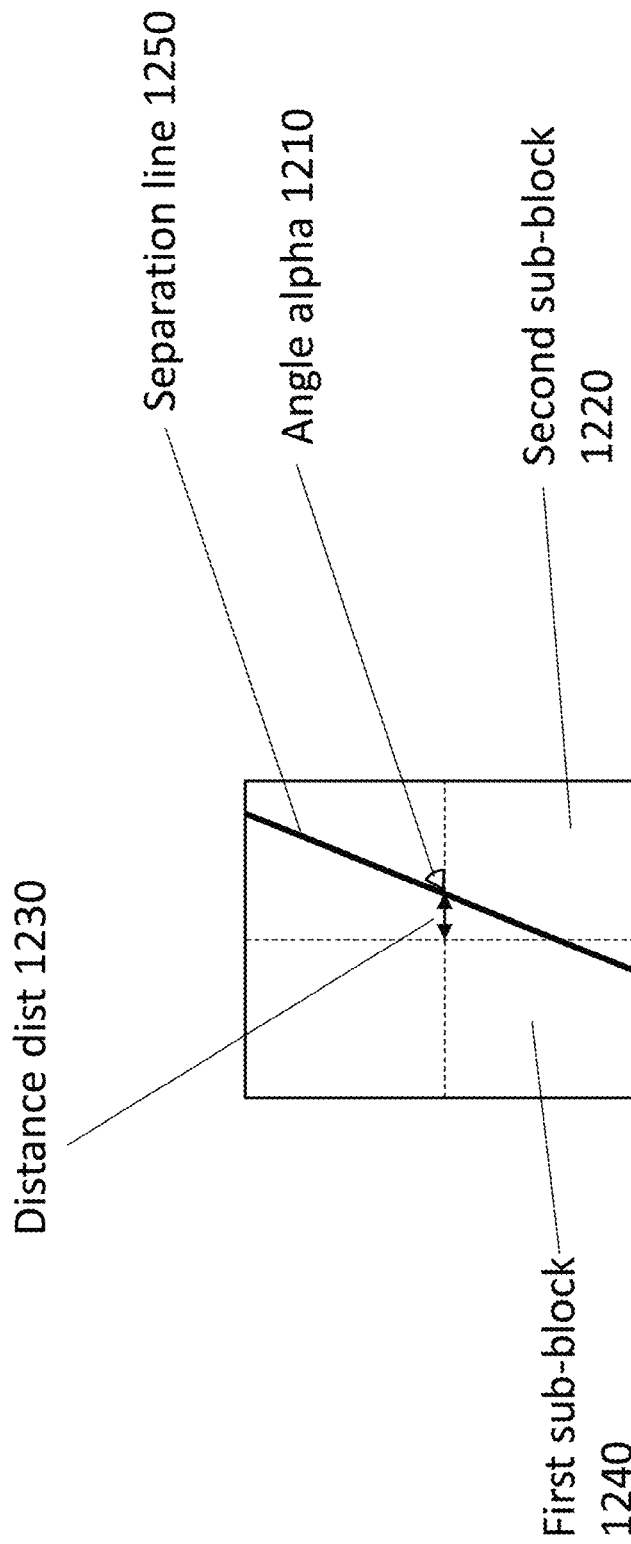
FIGS. 9-12 show examples for the partitioning a block.

In an example, in step 1, a coding block is divided into 2 sub-blocks in various ways. FIG. 9 shows an example about partitioning a coding block. A separation line 1250 divides the block into 2 sub-blocks, a first sub-block 1240 and a second sub-block 1220. In order to describe the line 1250, two parameters may be signaled: one parameter is an angle alpha 1210 and the other parameter is a distance dist 1230.

In some embodiments, the angle, as indicated in FIG. 9, is measured between the x-axis and the separation line, whereas the distance is measured by the length of a vector in the x-direction which starts at the center of the current block and ends at the separation line. Alternatively, the distance may be measured by the length of a vector which is perpendicular to the separation line and passes through the center of the current block.

Figure 10:
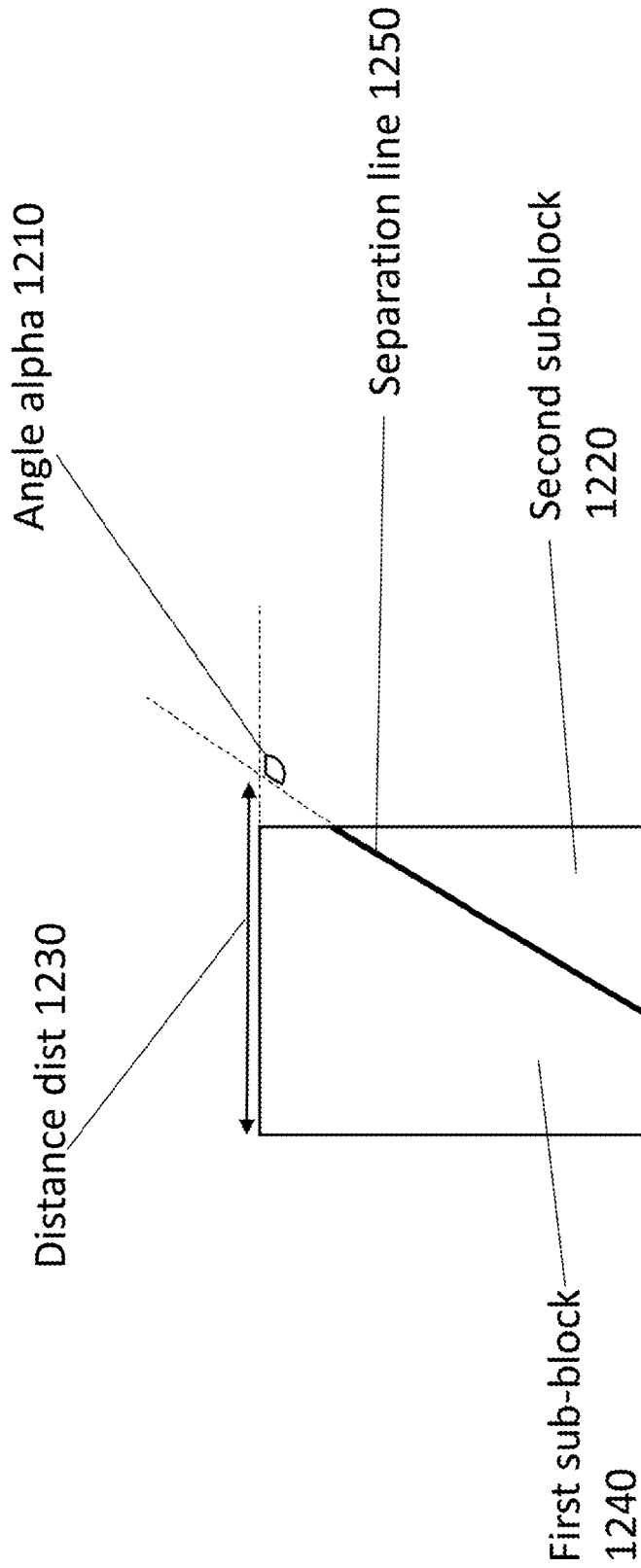

In another example, FIG. 10 shows an alternative way of representing the separation line, where the examples of the angle and the distance are different from the examples showed in FIG. 9. In the example of FIG. 10, the distance is determined by the offset of the separation line in the x-direction from the top-left corner of the current block. The angle is the opposite angle of the angle in FIG. 9. Various alternative combinations of angles and distance may be chosen to characterize the separation line.

In some example, in step 4, the division disclosed in step 1 is used for the combination of the first prediction values and the second prediction values, to obtain the combined prediction values. In an example, a blending operation is applied in step 4 in order to eliminate any artefacts (edgy or jugged appearance along the separation line). The blending operation can be described as a filtering operation around the separation line.

Since the 2 sub-blocks can be predicted using 2 different motion information (e.g., 2 different motion vectors and/or two different reference pictures), a discontinuity may be observed along the separation line. This discontinuity may be observed as edgy or blocky, which is not desired. In order to reduce the discontinuity, a blending operation can be applied at the intersection: However, a blending operation might cause significant blurring, especially if the original video has sharp edges.

Embodiments of the present invention relate to adaptively selecting a blending operation (or process, or function), such that the subjective quality (viewing experience) and compression efficiency of the video is increased.

Embodiment 1 (Decoder Perspective)

In this embodiment, the step 4 which is disclosed in the above process includes or consists of the following substeps:

Step 4.1:

Obtain a value of an indicator according to a bitstream, wherein the value of the indicator indicates which blending operation (e.g., a first (pre-defined) blending operation, a second (pre-defined) blending operation, or a third (pre-defined) blending operation . . . etc) is selected. The value of the indicator may also indicate that no blending operation is to be applied. Alternatively, a blending operation in the list of blending operations may specify that either the first or the second prediction value is used for the combined values, depending on the location of prediction sample, such that no actual filtering is applied as described further below.

Figure 11:
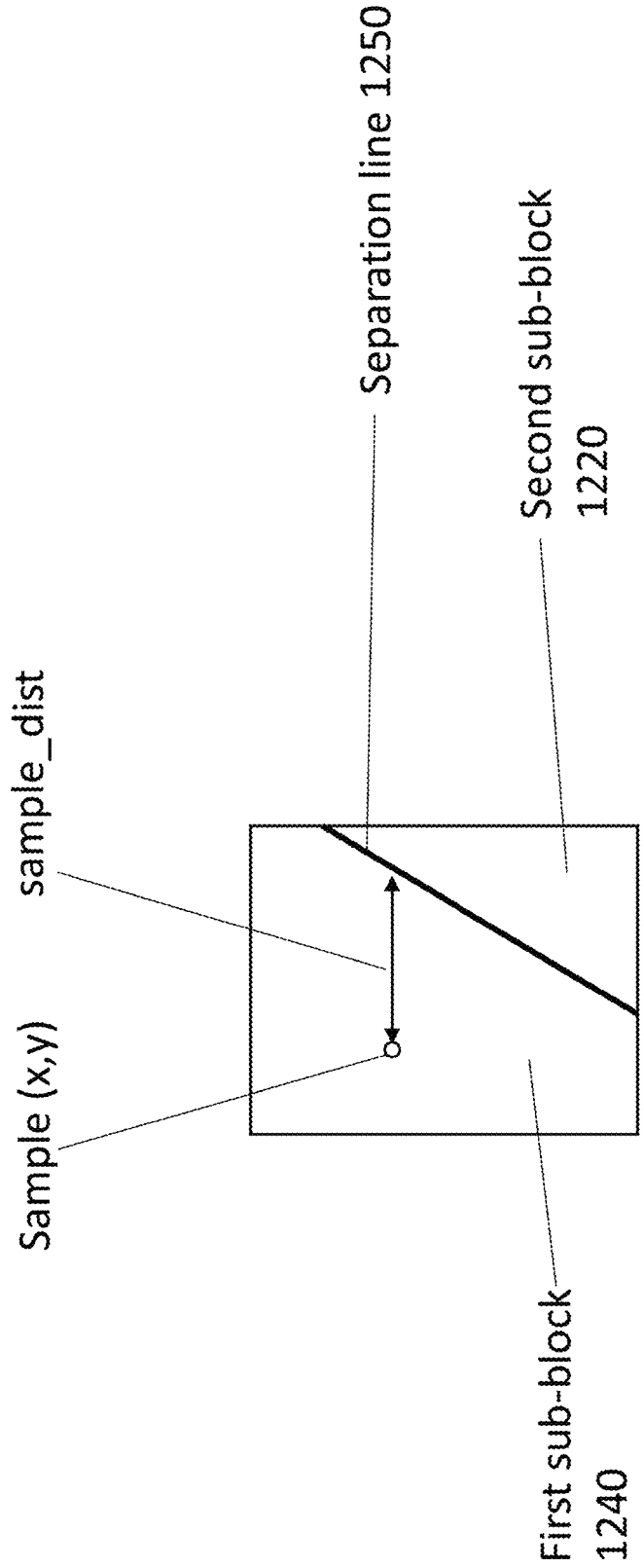
Figure 12:
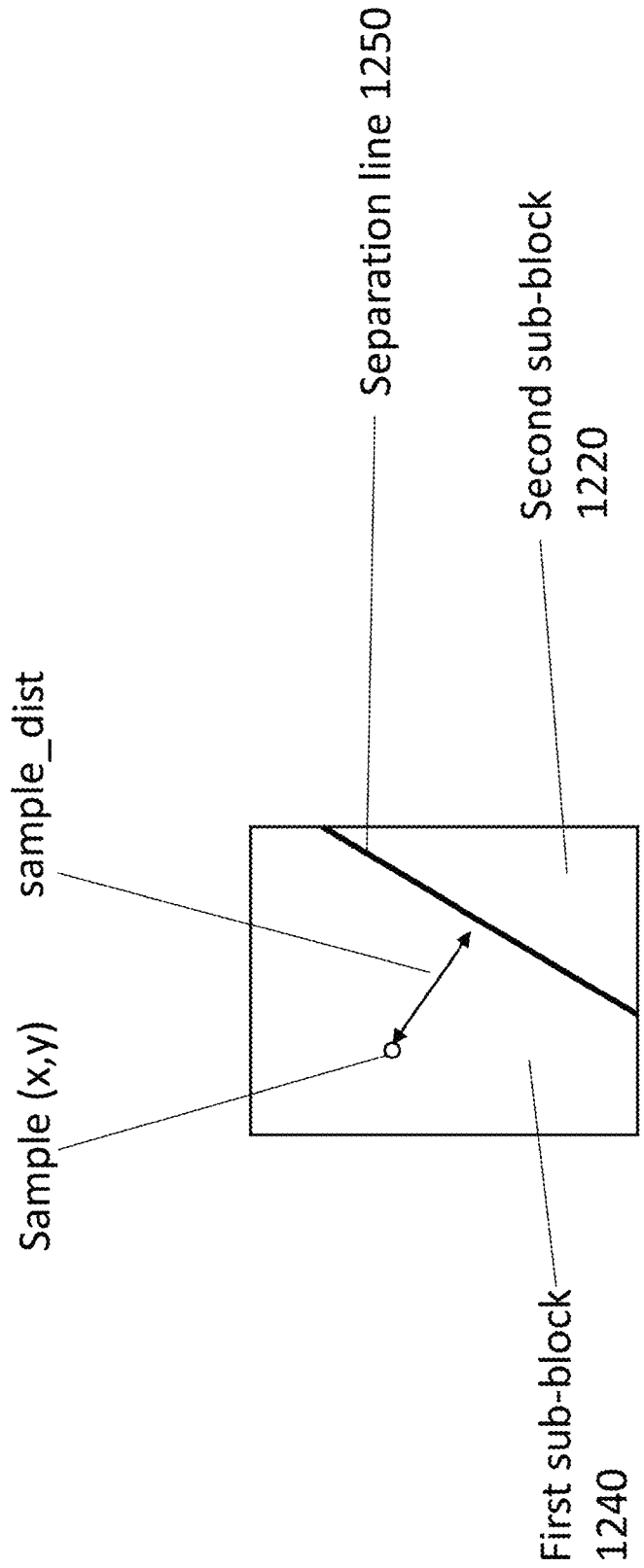

Step 4.2:

For a sample in a decoding block, a sample distance (sample_dist) is calculated, wherein the sample distance represents a distance of the sample from a separation line of the decoding block. The distance of the sample from the separation line may be determined in various ways. According to an example, the distance sample_dist may be determined as the distance of the sample (x, y) from the separation line 1250 along the x-direction as shown in FIG. 11. Similarly, the distance sample_dist may be determined as the distance along the y-direction. According to another example, the distance sample_dist may be determined as the perpendicular distance of the sample (x, y) from the separation line 1250 as shown in FIG. 12.

Step 4.3:

The calculated sample_dist is used to calculate weighting factors, the weighting factors are used for a combination of a first prediction value corresponding to the sample and a second prediction value corresponding to the sample. In an example, the weighting factors are denoted as sampleWeight1 and sampleWeight2, referring to a weight value corresponding to the first prediction value and a weight value corresponding to the second prediction value. In an example, the first weighting factor is calculated according to the sample_dist and a blending operation, and the blending operation is indicated according to the value of the indicator.

In an example, the second weighting factor is calculated according to the formula $$sampleWeight2 = T - sampleWeight1,$$

where T is a predefined constant.

Step 4.4:

The combined value of a prediction sample at the sample coordinate (x,y) is calculated according to a first prediction value at coordinate (x,y), a second prediction value at coordinate (x,y), sampleWeight1 and sampleWeight2. In other words, first prediction values and second prediction values according to the first and second prediction modes, respectively, may be determined for the entire current block. Subsequently, a weighted sum of the prediction values is calculated using sampleWeigth1 and sampleWeight2 to calculate the combined value of the prediction samples. If one of the sample weights is zero at a particular sample coordinate (x, y), determination of the respective prediction value, i.e., first or second prediction value, may be omitted.

It is noted that steps 4.1 and 4.2 can be performed according to any order, which means that steps 4.1 and 4.2 are independent of each other, the distance calculation can be performed independent from the selection of the blending filter.

Embodiment 2 (Encoder Perspective)

In this embodiment, the step 4 which is disclosed in the above process includes or consists of the following substeps:

Step 4.1:

Determine which blending operation is applied to a sample in a current coding block. This determination may include determining whether an actual blending operation, i.e., a filtering operation, is applied at all. In an example, the blending operation is determined based on a rate-distortion metric.

A value of an indicator for the block is encoded into a bitstream, wherein the value of the indicator indicates which blending operation (e.g., a first (pre-defined) blending operation, a second (pre-defined) blending operation or a third (pre-defined) blending operation . . . etc.) is selected. The value of the indicator may also indicate that no blending operation is to be applied. Alternatively, a blending operation in the list of blending operations may specify that either the first or the second prediction value is used for the combined values, depending on the location of prediction sample, such that no actual filtering is applied as described further below.

Optionally, the following additional steps are performed in this embodiment:

Step 4.2:

For a sample in the coding block, calculate a sample distance (sample_dist) which represents the distance of the sample from a separation line of the coding block. The distance may indicate a horizontal distance, i.e., the distance of the sample to the closest point in the separation line in the horizontal direction. Alternatively, the distance may indicate a vertical distance, or it may indicate a Euclidean distance (i.e., the distance of the sample to the separation line in the direction perpendicular to the separation line).

Step 4.3:

The calculated sample_dist is used to calculate weighting factors, the weighting factors are used for a combination of a first prediction value corresponding to the sample and a second prediction value corresponding to the sample. In an example, the weighting factors are denoted as sampleWeight1 and sampleWeight2, referring to a weight value corresponding to the first prediction value and a weight value corresponding to the second prediction value. In an example, the first weighting factor is calculated according to the sample_dist and a blending operation, and the blending operation is indicated according to the value of the indicator.

In an example, the second weighting factor is calculated according to the formula $$sampleWeight2 = T - sampleWeight1,$$

where T is a predefined constant. For a range of sampleWeight1 from 0 to T, this formula may allow for a transition from combined values based on the first prediction values only to combined values based on the second prediction values only, with a potential transition region with mixed combined values.

Step 4.4:

The combined value of a prediction sample at the sample coordinate (x,y) is calculated according to a first prediction value at coordinate (x,y), a second prediction value at coordinate (x,y), sampleWeight1 and sampleWeight2. Depending on the values of sampleWeight1 and sampleWeight2 that may depend on the sample coordinate (x,y), the combined value may be based on the first prediction value alone, based on the second prediction value alone, or on a weighted combination of the first and the second prediction value.

In an example, the sample distance sample_dist is calculated according to the formula:

$$\text{sample\_dist} = ((x<<1)+1)*Dis[\text{angleIdx1}] + ((y<<1)+1)*Dis[\text{angleIdx2}] - \text{offset}(\text{distanceIdx}).$$

The value of angleIdx1 and the value of angleIdx2 are obtained from the bitstream or derived/calculated based on other information obtained from the bitstream. angleIdx1 and angleIdx2 represent quantized trigonometric parameters of a separation line, wherein the first parameter is of type cosine and the second parameter is of type sine.

x and y are the x- and y-coordinates of a sample with respect to the top-left sample of a coding block.

offset(distanceIdx) is an offset value which is an output of a function of an index value (distanceIdx), wherein the index value is obtained from the bistream or derived/calculated based on other information obtained from the bistream. The offset(distanceIdx) may indicate the distance of the separation line to a specific point in the coding block. For example, the offset( ) may indicate the distance between the top-left sample of the coding block to the separation line. In this example, the offset( ) would indicate the sample distance to the separation line when the coordinates of the sample are (0,0). Or in another example, the offset( ) may indicate the distance of the center point of the coding block to the separation line. In yet another example, the distance may indicate a horizontal distance, i.e., the distance of the specific point to the closest point in the separation line in the horizontal direction. Or, the distance may indicate a vertical distance, or it may indicate a Euclidean distance.

Dis[ ] is a lookup table. Dis[angleIdx1] describes the change in the sample distance (sample_dist) with respect to a unit increase (an increase of value 1) in the x-coordinate of the sample. Dis[angleIdx2] describes the change in the sample distance (sample_dist) with respect to a unit increase (an increase of value 1) in the y-coordinate of the said sample.

In one example, the predefined constant T is equal to 8, which means that the sampleWeight1 and the sampleWeight2 can have values in a value range between 0 and 8 (inclusive 0 and 8). In another example, the predefined constant is T is equal to 16. In another example, the sample_dist and sampleWeight1 may be obtained according to the following equations:

$$nCbR=(W>H)?(W/H):(H/W),$$

$$\text{sample\_dist}=(W>H)?(\text{Clip3}(0,8,(x/nCbR-y)+4)):(\text{Clip3}(0,8,(x-y/nCbR)+4)),$$

or $$\text{sample\_dist}=(W>H)?(\text{Clip3}(0,8,(H-1-x/nCbR-y)+4)):(\text{Clip3}(0,8,(W-1-x-y/nCbR)+4)),$$

$$\text{sampleWeight1}=\text{Clip3}(0,8,\text{sample\_dist}),$$

where W is a Width of a coding block, H is a Height of the coding block, and nCbR represents an aspect ratio of the coding block.

It is noted that the above 2 examples show two methods of calculation according to integer arithmetic. However, embodiments of the invention are not limited to those examples of calculation of the sample_dist.

The combined value of a prediction sample may be computed by multiplying the first sample weight (sampleWeight1) value with the first prediction value at coordinate (x,y), multiplying the second sample weight (sampleWeight2) value with the second prediction value at coordinate (x,y) and by subsequently adding the two intermediate products and a rounding factor T/2. The combined value of the prediction sample is then calculated by division of the sum by the value T. In an example, the operation can be expressed as:

$$\text{predictionSample}(x,y)=(\text{sampleWeight1}*\text{prediction1}(x,y)+\text{sampleWeight2}*\text{prediction2}(x,y)+T/2)/T,$$

wherein predictionSample (x,y) is the (rounded) combined value of the prediction sample at coordinate (x,y), prediction1(x,y) is the first prediction value at coordinate (x,y), and prediction2(x,y) is the second prediction value at coordinate (x,y).

According to one example, a first weighting factor sampleWeight1 is obtained based on sample_dist and a lookup table. In an example, the lookup table is used to store filter coefficients. In other words, a blending operation is implemented according to a lookup table. In such an example, a function of sample_dist can be used as an index value for the look-up table. The function may be a division or multiplication with a constant number operation, a right shifting a constant amount operation, a taking the absolute value or a clipping operation or a combination of those.

In these examples, an input of the blending operation is a sample_dist (a vertical distance, a horizontal distance or a combination of vertical and horizontal distances from a line of separation, that is a line that divides a coding block into two sub-blocks), and the output of the blending operation is the sampleWeight1 or sampleWeight2.

According to another example, a blending operation is implemented as a function with sample_dist as input, and sampleWeight1 or sampleWeight2 as output. In an example, a blending operation can be implemented as sampleWeight1=Clip3(0, 8, sample_dist). In another example, a blending operation can be implemented as sampleWeight1=Clip3(0, 8, f(sample_dist)). The function f( ) can be a division/addition/multiplication with a constant number operation, a right shifting with a constant amount operation, taking the absolute value operation or a clipping operation or a combination of those. An offset of half the maximum clipping level, i.e., 4 for a clipping level of 8, may be added to the value of sample_dist to provide symmetric filtering/blending around the separation line. The upper clipping level (T as used above) may define the length of the applied filter.

According to embodiments of the invention, a first blending operation may be "sampleWeight=Clip3(0, 8, sample_dist)" and a second blending operation may be "sampleWeight=sample_dist==4?4:(sample_dist<4?0:8)".

Figure 13:
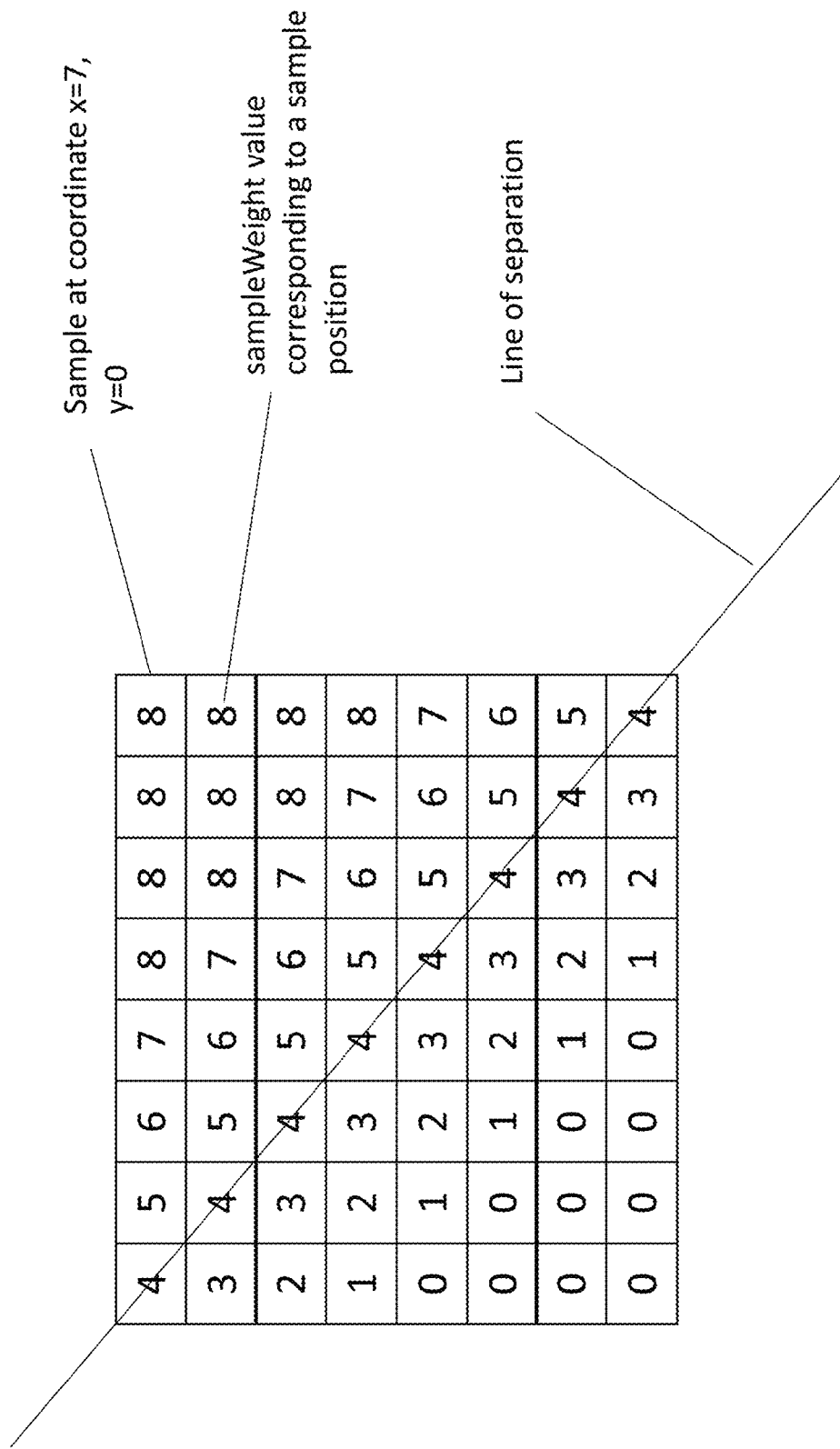
FIG. 13 shows an example of values of weighting factors for the process of a blending function.
Figure 14:
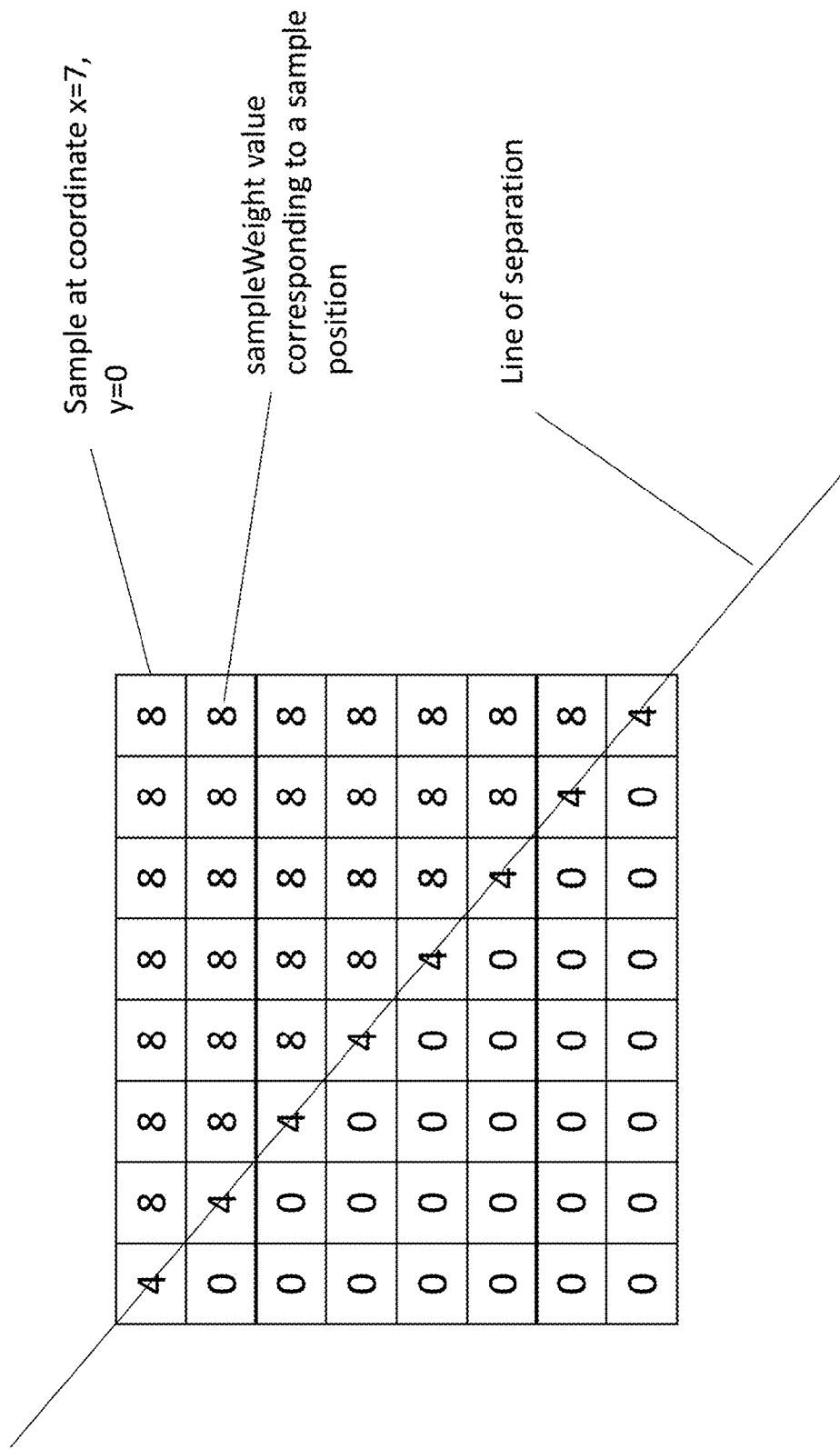
FIG. 14 shows another example of values of weighting factors for the process of a blending function.

In both cases, an offset of 4 may be added to sample_dist to provide symmetric filtering as shown in FIGS. 13 and 14. A result of the first blending operation and a result of the second blending operation are exemplified in FIG. 13 and FIG. 14, respectively. A number inside the block corresponds to a sampleWeight value corresponding to that sample position. When a value of the sampleWeight is equal to either 0 or 8, the combined value of a prediction sample at that sample position is a first prediction value or a second prediction value. When a value of the sampleWeight is in a value range between 0 or 8 (exclusive 0 and 8), the combined value of the prediction sample is obtained by weighted averaging of the first prediction value and the second prediction value (for example, if a value of the sampleWeight is 4, this indicates weighted averaging with equal weights). According to the above formulas, sampleWeight1 may be set to sampleWeight and sampleWeight2 may be set to 8-sampleWeight.

In an embodiment, a first blending operation is a long blending operation (e.g., filter), where multiple filter coefficients at the left side or the right side of the separation line have a value that is different from 0 or 8, resulting in a smooth transition from prediction1 and prediction2 as shown in FIG. 13. A second blending filter is a short blending operation (e.g., filter), as the filter coefficients that are close to the separation line have values near the minimum and maximum value of 0 and 8, resulting in a rapid transition from prediction1 and prediction2 as shown in FIG. 14.

According to embodiments of the invention, a blending operation is selected according to a value of an indicator in a bitstream.

A long blending operation has a higher smoothing property than a short blending operation. Therefore, a long blending operation is good for smoothing edge artefacts that can be caused due to sub-block partitioning. An effect according to the use of a short blending operation is that sharp details are retained better.

According to embodiments of the invention, a blending operation is applied to a sample according to a value of an indicator in a bitstream.

In an embodiment, a first blending operation may be:

First blending operation: "sampleWeight=Clip3(0,8, sample_dist)"

In an embodiment, a second blending operation may be:

"sampleWeight=sample_dist==4?4:(sample_dist<4?0: 8)", or

"sampleWeight=Clip3(0,8,(sample_dist−4)*K+ sample_dist)"

K is an integer with a value greater than 0. It is noted that the blending operation becomes shorter (hence sharper) with increasing K. For example, when K=4, then the second blending operation becomes "sampleWeight=sample_dist==4?4:(sample_dist<4?0: 8)",whose behavior was exemplified in FIG. 14.

In the above blending operations, the value of sample_dist resulting from the calculation of the distance of the sample from the separation line may be modified by adding an offset (here: 4) to provide a symmetric filtering operation.

Alternatively, the blending operations (without addition of an offset to sample_dist) may be defined as follows:

In an embodiment, a first blending operation may be:

First blending operation: "sampleWeight=Clip3(0,8, sample_dist+4)"

In an embodiment, a second blending operation may be:

"sampleWeight=sample_dist==0?4:(sample_dist<0?0: 8)", or

"sampleWeight=Clip3(0,8,sample_dist*K+sample_ dist+4)"

According to one example, a value of an indicator in a bitstream indicates a value of L. In this case, L can have a value of 0 (indicating that the selected blending operation is the first blending operation), or a different value of L (which can indicate a second or a third, etc. blending operation).

In an embodiment, the second blending operation may be:

"sampleWeight=sample_dist<=D/2?0:$T$" or,

"sampleWeight=sample_dist<D/2?0:$T$".

The above two examples describe switching off the blending operation. In the above examples, a value of the sampleWeight is equal to 0 or T. For a sample, either the first prediction is the combined (or final) prediction or the second prediction is the combined (or final) prediction. The combined prediction may be given by the following equation:

Combined prediction(x,y)=$f$(sampleWeight*first_prediction(x,y)+second prediction(x,y)*($T$−sampleWeight)).

According to the equation, the combined prediction of a sample at coordinate (x,y) is a weighted combination of the first and the second predictions at coordinate (x,y) and the weighting factor (sampleWeight) is calculated for the sample. In the above two examples a value of the sampleWeight may be 0 or T, such that the combined prediction at coordinate (x,y) is determined by the first prediction or the second prediction at (x,y). In an example, the function f( ) represents a rounding operation or a clipping operation. In some embodiments, T is a positive integer value. A value of T can be 8. D is a pre-determined (or derived, or decoded) real number, in some examples, D is equal to T, or 2T or T/2. D/2 may indicate an offset added to the value of sample_dist.

According to an embodiment of the invention, the first blending operation and the second blending operation can be implemented as lookup tables, such as the tables exemplified in FIG. 15. In this case, in an example, the sampleWeight can be obtained as sampleWeight=geoFilter[idx], where idx is obtained as a function of sample_dist, and geoFilter is a one-dimensional linear array of filter weights. One such function can be: idx=min((abs(sample_dist)+8)>>4, maxIdx), where the maxIdx is the maximum value that the idx can assume. In the case of table 17-2, for example, the maxIdx is 7. In this embodiment, sample_dist may indicate the distance of the sample without an offset added.

In another embodiment of the invention, the first blending operation and the second blending operation can be derived from a same look-up table, by performing a scaling of the sample distance sample_dist using a factor fscale in the following manner:

sampleWeight=geoFilter[idx],idx=min((abs(sample_ dist)+(1<<(fscale−1)))>>fscale, The value of fscale can be determined depending on a value of the indicator that is present in the bitstream. For example, if the indicator value L is equal to 0, the sample weight values of a first blending filter can be obtained by:

sampleWeight=geoFilter[idx1]

with the value of fscale equal to 4.

idx1=min((abs(sample_dist)+8)>>4.

In another example, if the indicator value L is equal to 1, the sample weight values of a second blending filter can be obtained by sampleWeight=geoFilter[idx2], with the value of fscale equal to 3.

idx2=min((abs(sample_dist)+4)>>3.

Further, the value of fscale can be determined depending on the size of the current block. For example, a value of fscale is equal to 4 for a block of size smaller or equal to 16×16 luma samples, and a value of fscale is equal to 5 for a block of size larger than 16×16 luma samples.

Other values of fscale may also be possible. A higher value for fscale has the effect of making the overall blending operation wider (e.g., more smoothing) and a smaller value for fscale has the effect of making the overall blending operation shorter (e.g., less smoothing). In another embodiment, the second blending operation can be obtained according to the following equation:

sampleWeight=0 if sample_dist<=0 sampleWeight=$T$ if sample_dist>0 or in another example, the second blending operation can be obtained according to the following equation:

sampleWeight=0 if sample_dist<0 sampleWeight=$T$ if sample_dist>=0.

Here, the value of sample_dist may indicate the distance of the sample from the separation line without an added offset.

A value of the sampleWeight that corresponds to a sample at coordinate (x,y) is either equal to 0 or equal to T, depending on the value of the sample_dist. In another example, the value of sampleWeight may be derived based on a sign of sample_dist, the sign of sample_dist indicates on which side of the separation line a sample is located. In an example, a bi-level weight of either 0 or T is used for a sample. The value 0 or T indicates that either the first prediction is the combined (or final) prediction or the second prediction is the combined (or final) prediction. Thus, the described second blending operation does not apply any filtering such that sharpness of a feature is maintained and blurring is avoided. The combined prediction may be given by the following equation:

Combined prediction(x,y)=$f$(sampleWeight*first prediction(x,y)+second prediction(x,y)*($T$−sampleWeight)).

According to the equation, the combined prediction of a sample at coordinate (x,y) is a weighted combination of the first and the second predictions at coordinate (x,y) and the weighting factor (sampleWeight) is calculated for the sample. In the above two examples a value of the sampleWeight may be 0 or T, such that the combined prediction at coordinate (x,y) is determined by the first prediction or the second prediction at (x,y). In an example, the function f( ) represents a rounding operation or a clipping operation. In some embodiments, T is a positive integer value. A value of T can be 8.

According to embodiments of the present invention, a value of an indicator can be encoded into (or obtained from) a parameter set, such as a sequence parameter set or a picture parameter set or an adaptation parameter set. In another example, a value of the indicator can be encoded into (or obtained from) a header, such as a picture header or a tile header or a tile group header or a slice header. According to one embodiment of the invention, there can be a value of a first indicator in a header, that indicates which blending operation (a first blending filter or a second blending filter etc.) is selected, and a value of a second indicator in a parameter set that indicates presence of the value of the first indicator in the bitstream. When the value of the first indicator is not present in the bitstream according to the value of the second indicator, the value of the first indicator can be inferred to be 0.

Figure 16:
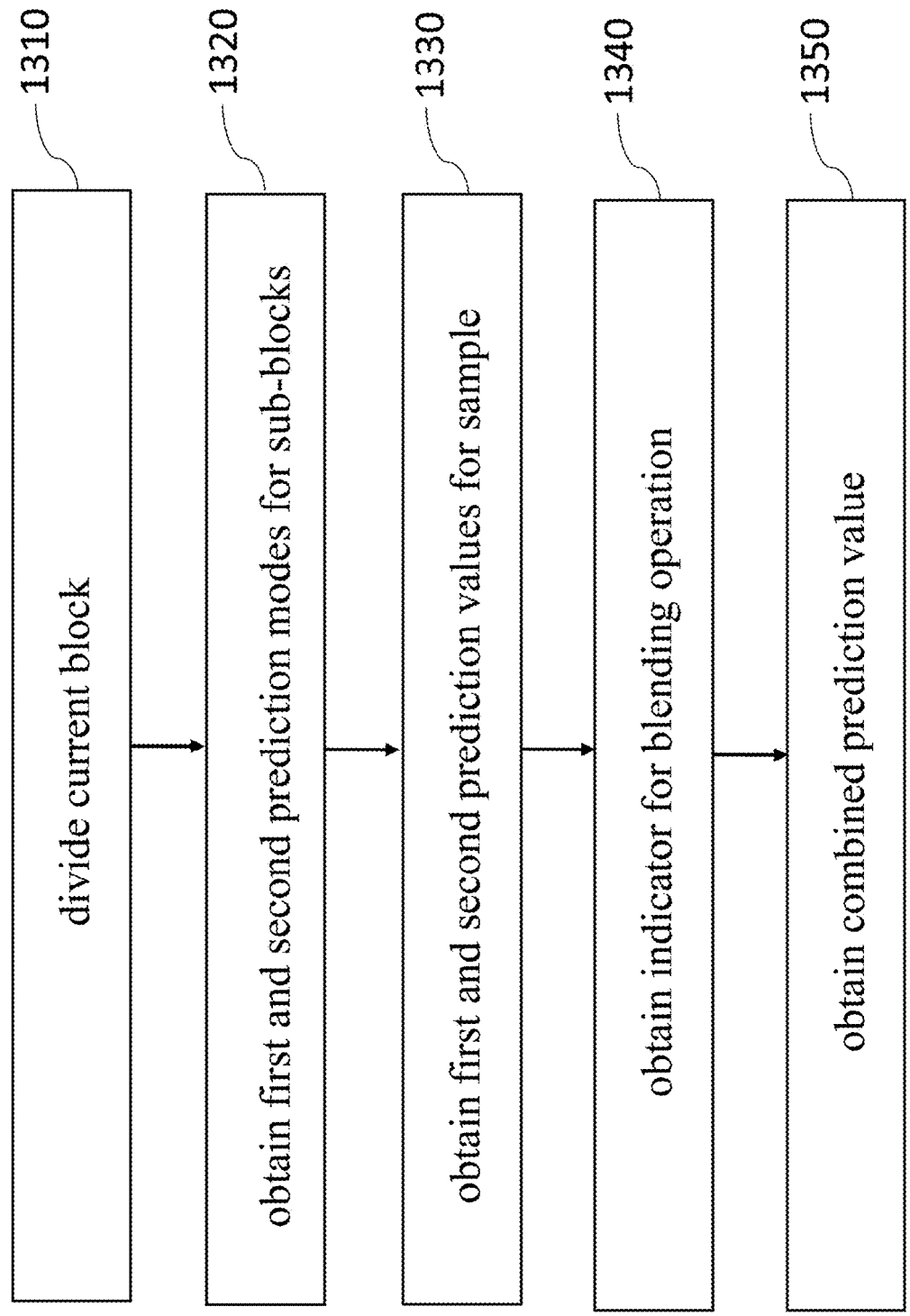
FIG. 16 shows a flowchart for a method of video decoding/encoding according to an embodiment of the disclosure.

FIG. 16 shows a flowchart for a method of video decoding/encoding according to an embodiment of the disclosure. In step 1310, a current block is divided into at least two sub-blocks. In step 1320, a first prediction mode for a first sub-block in the at least two sub-blocks and a second prediction mode for a second sub-block in the at least two sub-blocks are obtained. In step 1330, a first prediction value for a sample in the current block according to the first prediction mode and a second prediction value for the sample in the current block according to the second prediction mode are obtained. In step 1340, an indicator including information on performing a blending operation for the sample in the current block is obtained. Finally, in step 1350, a combined prediction value for the sample in the current block is obtained based on the indicator, the first prediction value and the second prediction value. It is understood that the order of the method steps is only illustrative and may be changed. By way of example, step 1340 may be performed before step 1330 to determine whether a sample weight for one of the first and second prediction modes is zero such that determining the respective prediction value may be omitted in step 1330.

Figure 17:
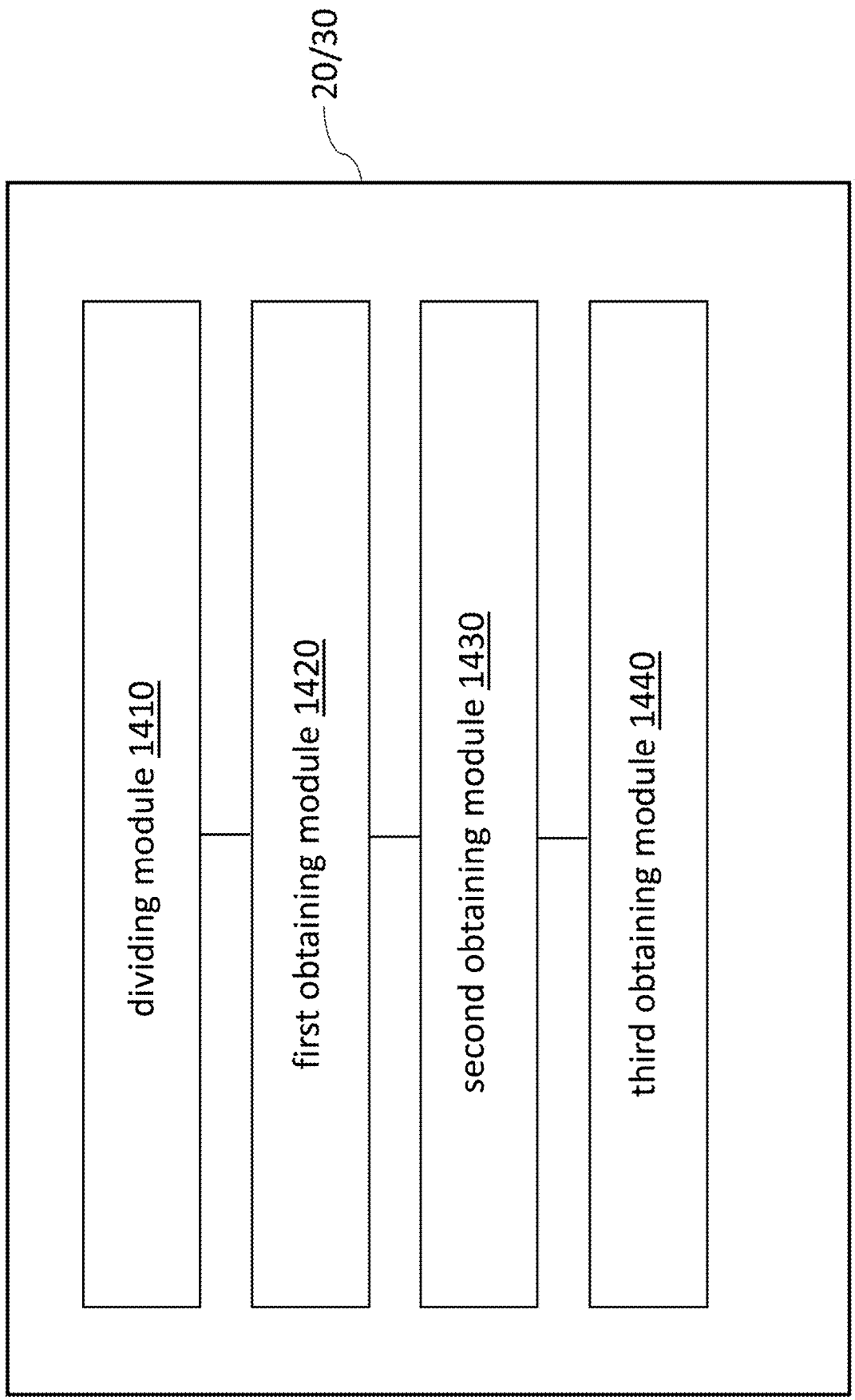
FIG. 17 shows a block diagram illustrating an example of a decoding/encoding apparatus according to an embodiment of the disclosure.

FIG. 17 shows a block diagram illustrating an example of a decoding/encoding apparatus according to an embodiment of the disclosure. The decoding apparatus 30 or the encoding apparatus 20 comprises a dividing module 1410 configured to divide a current block into at least two sub-blocks, a first obtaining module 1420 configured to obtain a first prediction mode for a first sub-block in the at least two sub-blocks and a second prediction mode for a second sub-block in the at least two sub-blocks, and to obtain a first prediction value for a sample in the current block according to the first prediction mode and a second prediction value for the sample in the current block according to the second prediction mode, a second obtaining module 1430 configured to obtain an indicator, wherein the indicator includes information on performing a blending operation for the sample in the current block, and a third obtaining module 1440 configured to obtain a combined prediction value for the sample in the current block, based on the indicator, the first prediction value and the second prediction value.

The obtaining modules 1420, 1430, and 1440 and the dividing module 1410 may be implemented in hardware, software, firmware, or any combination thereof. If implemented in software, the functions may be stored on a computer-readable medium or transmitted over communication media as one or more instructions or code and executed by a hardware-based processing unit. Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

Following is an explanation of the applications of the encoding method as well as the decoding method as shown in the above-mentioned embodiments, and a system using them.

Figure 18:
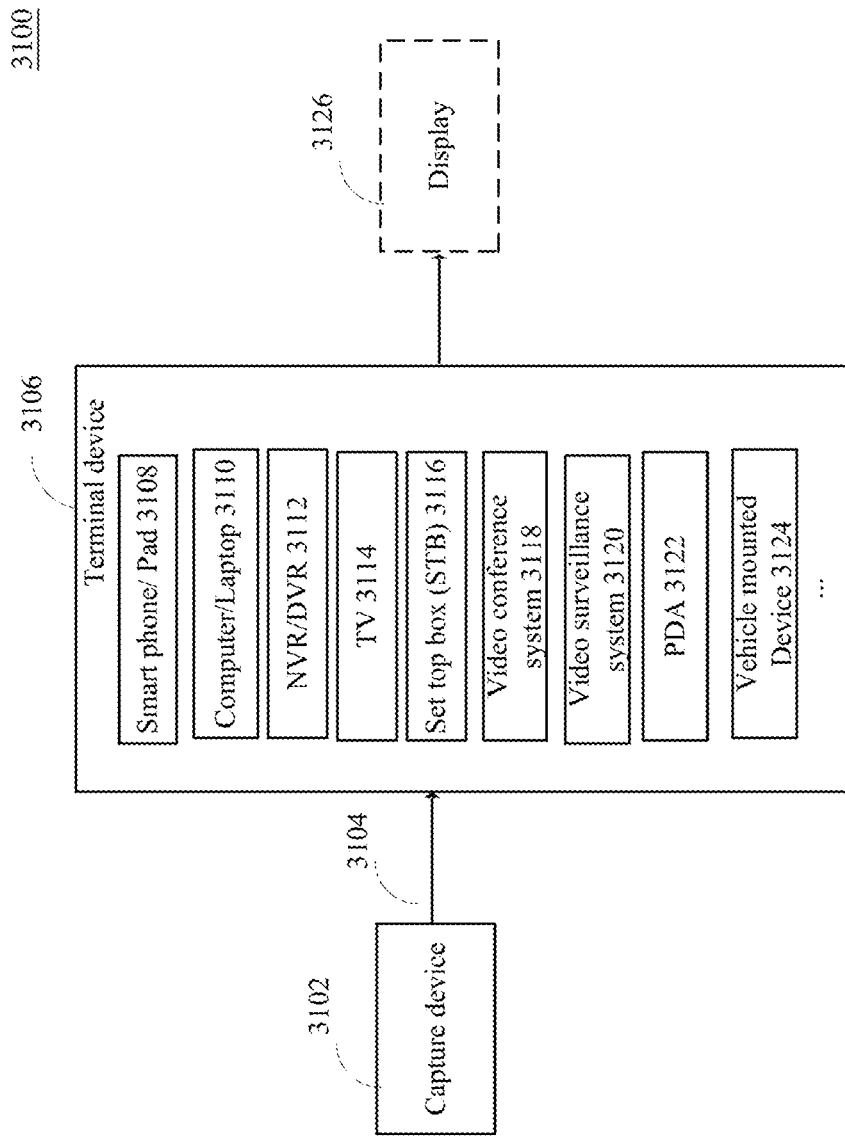
FIG. 18 is a block diagram showing an example structure of a content supply system 3100 which realizes a content delivery service.

FIG. 18 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 3106 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 19:
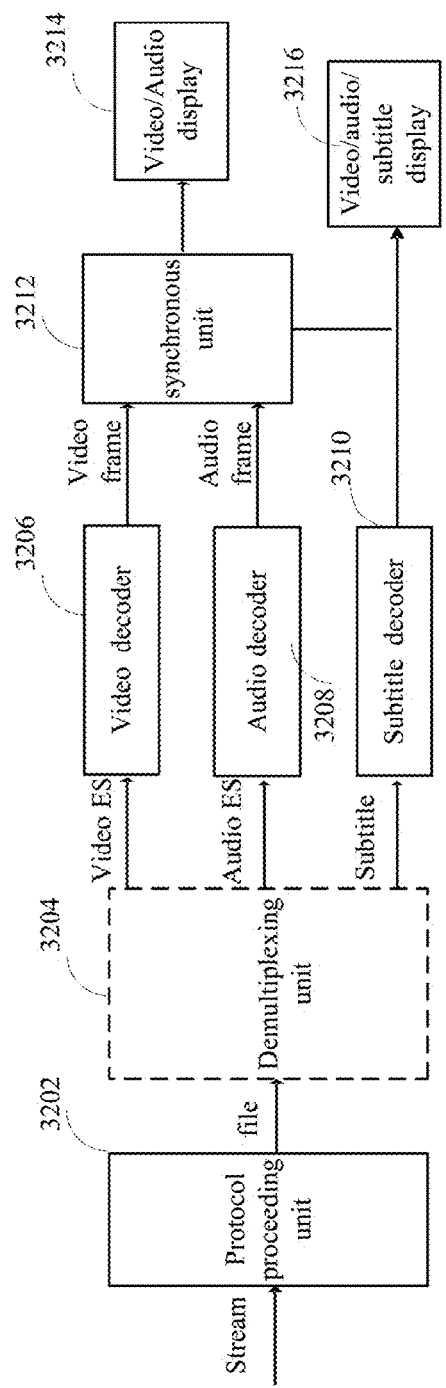
FIG. 19 is a block diagram showing a structure of an example of a terminal device.

FIG. 19 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-dynamic adaptive streaming over HTTP (DASH), Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 19) before feeding it to the synchronous unit 3212. Similarly, the audio frame may store in a buffer (not shown in FIG. 19) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, i.e., "the first" is equivalent to the 0-th, "the second" is equivalent to the 1st, etc.

Arithmetic Operators

The following arithmetic operators are defined as follows:

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7 / 4 and −7 / −4 are truncated to 1 and −7 / 4 and 7 / −4 are truncated to −1. |
| ÷ | Used to denote division in mathematical equations where no truncation or rounding is intended. |
| $\frac{x}{y}$ | Used to denote division in mathematical equations where no truncation or rounding is intended. |
| $\sum_{i=x}^{y} f(i)$ | The summation of f( i ) with i taking all integer values from x up to and including y. |
| x % y | Modulus. Remainder of x divided by y, defined only for integers x and y with x >= 0 and y > 0. |

Logical Operators

The following logical operators are defined as follows:

x && y Boolean logical "and" of x and y x||y Boolean logical "or" of x and y

! Boolean logical "not"

x?y:z If x is TRUE or not equal to 0, evaluates to the value of y; otherwise, evaluates to the value of z.

Relational Operators

The following relational operators are defined as follows:

\> Greater than

\>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

−− Decrement, i.e., x−− is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$Abs(x) = \begin{cases} x; & x >= 0 \\ -x; & x < 0 \end{cases}$$

Asin (x) the trigonometric inverse sine function, operating on an argument x that is in the range of −1.0 to 1.0, inclusive, with an output value in the range of −π÷2 to π÷2, inclusive, in units of radians.

Atan(x) the trigonometric inverse tangent function, operating on an argument x, with an output value in the range of −π÷2 to π÷2, inclusive, in units of radians.

$$Atan2(y, x) = \begin{cases} Atan\left(\frac{y}{x}\right); & x > 0 \\ Atan\left(\frac{y}{x}\right) + \pi; & x < 0 \ \&\& \ y >= 0 \\ Atan\left(\frac{y}{x}\right) - \pi; & x < 0 \ \&\& \ y < 0 \\ +\frac{\pi}{2}; & x == 0 \ \&\& \ y >= 0 \\ -\frac{\pi}{2}; & \text{otherwise} \end{cases}$$

Ceil(x) the smallest integer greater than or equal to x.

Clip1$_Y$(x)=Clip3(0,(1<<BitDepth$_Y$)−1, x)

Clip1$_C$(x)=Clip3(0,(1<<BitDepth$_C$)−1, x)

$$Clip3(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$Min(x, y) = \begin{cases} x; & x <= y \\ y; & x > y \end{cases}$$

$$Max(x, y) = \begin{cases} x; & x >= y \\ y; & x < y \end{cases}$$

Round(x)=Sign(x)*Floor(Abs(x)+0.5)

$$Sign(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x,y)=(y,x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)

operations (with operands x, y, and z)

"x++", "− −"
"!x", "−x" (as a unary prefix operator)
$x^y$

"x ∗ y", "x / y", "x ÷ y", "$\frac{x}{y}$", "x % y"

"x + y", "x − y" (as a two-argument operator), "$\sum_{i=x}^{y} f(i)$"

"<< y", "x >> y"
"x < y", "x <= y", "x > y", "x >= y"
"x = = y", "x != y"
"x & y"
"x | y"
"x && y"
"x | | y"
"x ? y : z"
"x..y"
"x = y", "x += y", "x −= y"

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
may be described in the following manner:
... as follows / ... the following applies:
- If condition 0, statement 0
- Otherwise, if condition 1, statement 1
- ...
- Otherwise (informative remark on remaining condition), statement n
```

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " may always be an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a || condition 1b )
    statement 1
...
else
    statement n
may be described in the following manner:
    ... as follows / ... the following applies:
- If all of the following conditions are true, statement 0:
    - condition 0a
    - condition 0b
```
- Otherwise, if one or more of the following conditions are true, statement 1:
    - condition 1a
    - condition 1b
- ...
- Otherwise, statement n In the text, a statement of logical operations as would be described mathematically in the following form:
  if(condition 0)
      statement 0
  if(condition 1)
      statement 1
may be described in the following manner:
   When condition 0, statement 0
   When condition 1, statement 1

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e., the processing or coding of an individual picture independent of any preceding or consecutive picture as in video coding. In general, only inter-prediction units 244 (encoder) and 344 (decoder) may not be available in case the picture processing coding is limited to a single picture 17. All other functionalities (also referred to as tools or technologies) of the video encoder 20 and the video decoder 30 may equally be used for still picture processing, e.g., residual calculation 204/304, transform 206, quantization 208, inverse quantization 210/310, (inverse) transform 212/312, partitioning 262, intra-prediction 254/354, and/or loop filtering 220, 320, and entropy coding 270 and entropy decoding 304.

Embodiments, e.g., of the encoder 20 and the decoder 30, and functions described herein, e.g., with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which correspond to tangible media such as data storage media, or communication media including any medium that facilitates transfer of a computer program from one place to another, e.g., according to a communication protocol. In this manner, computer-readable media generally may correspond to (1) tangible computer-readable storage media which are non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, electronically erasable programmable ROM (EEPROM), compact disc-ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method for video coding implemented by a decoding device or an encoding device, the method comprising:
    dividing a current block into at least two sub-blocks;
    obtaining a first prediction mode for a first sub-block in the at least two sub-blocks and obtaining a second prediction mode for a second sub-block in the at least two sub-blocks;
    obtaining a first prediction value for a sample in the current block according to the first prediction mode and obtaining a second prediction value for the sample in the current block according to the second prediction mode;
    obtaining an indicator, wherein the indicator comprises information on performing a blending operation for the sample in the current block; and
    obtaining a combined prediction value, for the sample in the current block, based on the indicator, the first prediction value, and the second prediction value, by:
        determining a sample distance for the sample in the current block with regard to a separation line dividing the current block into the first sub-block and the second sub-block;
        calculating a first weight value according to the sample distance for the sample in the current block and the blending operation which is indicated by the indicator; and
        obtaining a second weight value according to the first weight value; and
        obtaining the combined prediction value for the sample in the current block, by weighting the first prediction value and the second prediction value, according to the first weight value and the second weight value, respectively.

2. The method of claim 1, further comprising:
    determining, based on the indicator, whether the blending operation is performed for the sample in the current block.

3. The method of claim 2, wherein, upon a determination that the blending operation is not performed for the sample in the current block, the combined prediction value for the sample is obtained either as the first prediction value or as the second prediction value.

4. The method of claim 1, further comprising:
    selecting, based on the indicator, the blending operation from a plurality of blending operations.

5. The method of claim 1, wherein the indicator is coded in a bitstream of a video sequence.

6. The method of claim 5, wherein the indicator comprises a first indicator indicating which blending operation is selected, and a second indicator indicating presence of the first indicator in the bitstream.

7. The method of claim 5, wherein the indicator is encoded in a sequence parameter set or a picture parameter set or an adaptation parameter set.

8. The method of claim 5, wherein the indicator is encoded in a picture header or a tile header or a tile group header or a slice header.

9. The method of claim 1, wherein the blending operation is implemented as:

sampleWeight1=Clip3(0,2*K,sample_dist), wherein sampleWeight1 is the first weight value, sample_dist is a value of the sample distance for the sample in the current block with an offset of K added, K is an integer value with a value greater than 0, and wherein a definition of function Clip3 is as follows:

$$Clip3(x, y, z) = \begin{cases} x; & z < x \\ y; & z > y \\ z; & \text{otherwise} \end{cases}.$$

10. The method of claim 1, wherein the blending operation is implemented as:

sampleWeight1=Clip3(0,2*K,f(sample_dist)), wherein sampleWeight1 is the first weight value, sample_dist is a value of the sample distance for the sample in the current block with an offset of K added, K is an integer value with a value greater than 0, and f( ) is a function, and wherein a definition of function Clip3 is as follows:

$$Clip3(x, y, z) = \begin{cases} x; & z < x \\ y; & z > y \\ z; & \text{otherwise} \end{cases}.$$

11. The method of claim 9, wherein K is equal to 4.

12. The method of claim 1, wherein the blending operation is implemented as:

sampleWeight1=sample_dist==4?4:(sample_dist<4?0: 8); or as sampleWeight1=Clip3(0,8,(sample_dist−4)*K+ sample_dist), wherein the sampleWeight1 is the first weight value, sample_dist is a value of the sample distance for the sample in the current block with an offset of 4 added, K is an integer with a value greater than 0, and wherein a definition of function Clip3 is as follows:

$$Clip3(x, y, z) = \begin{cases} x; & z < x \\ y; & z > y \\ z; & \text{otherwise} \end{cases}.$$

13. The method of claim 1, wherein the blending operation is implemented as:

sampleWeight1=geoFilter[idx], wherein idx is obtained as a function of sample_dist, the sample_dist is a value of the sample distance for the sample in the current block, and geoFilter is a one-dimensional linear array of filter weights.

14. The method of claim 1, wherein obtaining the combined prediction value for the sample in the current block involves at least one of a rounding operation and a clipping operation.

15. The method of claim 1, wherein parameters specifying the separation line are signaled in a bitstream of a video sequence.

16. The method of claim 15, wherein the parameters specifying the separation line include at least one of an angle and a distance.

17. A decoder, the decoder comprising:
one or more processors; and
a non-transitory computer-readable storage medium coupled to the one or more processors and storing computer program instructions for execution by the one or more processors, wherein the computer program instructions, when executed by the one or more processors, cause the decoder to perform operations of,
dividing a current block into at least two sub-blocks;
obtaining a first prediction mode for a first sub-block in the at least two sub-blocks and obtaining a second prediction mode for a second sub-block in the at least two sub-blocks;
obtaining a first prediction value for a sample in the current block according to the first prediction mode and obtaining a second prediction value for the sample in the current block according to the second prediction mode;
obtaining an indicator, wherein the indicator includes information on performing a blending operation for the sample in the current block; and
obtaining a combined prediction value for the sample in the current block, based on the indicator, the first prediction value, and the second prediction value, by:
determining a sample distance for the sample in the current block with regard to a separation line dividing the current block into the first sub-block and the second sub-block;
calculating a first weight value according to the sample distance for the sample in the current block and the blending operation which is indicated by the indicator; and
obtaining a second weight value according to the first weight value; and
obtaining the combined prediction value for the sample in the current block, by weighting the first prediction value and the second prediction value, according to the first weight value and the second weight value, respectively.

18. A non-transitory computer-readable medium having stored thereon instructions that, when executed by one or more processors, cause the one or more processors to perform operations comprising:
dividing a current block into at least two sub-blocks;
obtaining a first prediction mode for a first sub-block in the at least two sub-blocks and obtaining a second prediction mode for a second sub-block in the at least two sub-blocks;
obtaining a first prediction value for a sample in the current block according to the first prediction mode and obtaining a second prediction value for the sample in the current block according to the second prediction mode;
obtaining an indicator, wherein the indicator includes information on performing a blending operation for the sample in the current block; and
obtaining a combined prediction value for the sample in the current block, based on the indicator, the first prediction value, and the second prediction value, by:
determining a sample distance for the sample in the current block with regard to a separation line dividing the current block into the first sub-block and the second sub-block;
calculating a first weight value according to the sample distance for the sample in the current block and the blending operation which is indicated by the indicator; and
obtaining a second weight value according to the first weight value; and
obtaining the combined prediction value for the sample in the current block, by weighting the first prediction value and the second prediction value, according to the first weight value and the second weight value, respectively.

* * * * *

UNITED STATES PATENT AND TRADEMARK OFFICE
CERTIFICATE OF CORRECTION

| | | |
|---|---|---|
| PATENT NO. | : 12,047,555 B2 | Page 1 of 1 |
| APPLICATION NO. | : 17/557930 | |
| DATED | : July 23, 2024 | |
| INVENTOR(S) | : Esenlik et al. | |

It is certified that error appears in the above-identified patent and that said Letters Patent is hereby corrected as shown below:

On the Title Page

The following foreign application priority data section should be added:
-- Foreign Application Priority Data
June 21, 2019 (EP)......PCT/EP2019/066514
June 25, 2019 (EP)......PCT/EP2019/066876 --.

Signed and Sealed this
Twenty-ninth Day of April, 2025

Coke Morgan Stewart
*Acting Director of the United States Patent and Trademark Office*